US007418410B2

(12) United States Patent
Caiafa

(10) Patent No.: US 7,418,410 B2
(45) Date of Patent: Aug. 26, 2008

(54) METHODS AND APPARATUS FOR ANONYMOUSLY REQUESTING BIDS FROM A CUSTOMER SPECIFIED QUANTITY OF LOCAL VENDORS WITH AUTOMATIC GEOGRAPHIC EXPANSION

(76) Inventor: Nicholas Caiafa, 4106 Judd, Schiller Park, IL (US) 60176

( * ) Notice: Subject to any disclaimer, the term of this patent is extended or adjusted under 35 U.S.C. 154(b) by 461 days.

(21) Appl. No.: 11/031,755

(22) Filed: Jan. 7, 2005

(65) Prior Publication Data

US 2006/0155609 A1 Jul. 13, 2006

(51) Int. Cl.
G06Q 30/00 (2006.01)
(52) U.S. Cl. ...................................................... 705/26
(58) Field of Classification Search .................. 705/26, 705/27
See application file for complete search history.

(56) References Cited

U.S. PATENT DOCUMENTS

| 5,664,115 | A | 9/1997 | Fraser |
| 5,715,444 | A | 2/1998 | Danish et al. |
| 5,778,368 | A | 7/1998 | Hogan et al. |
| 5,895,454 | A | 4/1999 | Harrington |
| 5,924,090 | A | 7/1999 | Krellenstein |
| 5,978,768 | A | 11/1999 | McGovern et al. |
| 5,983,219 | A | 11/1999 | Danish et al. |
| 5,991,739 | A | 11/1999 | Cupps et al. |
| 6,005,504 | A | 12/1999 | Hirono |
| 6,085,188 | A | 7/2000 | Bachmann et al. |
| 6,094,649 | A | 7/2000 | Bowen et al. |
| 6,169,992 | B1 | 1/2001 | Beall et al. |
| 6,189,003 | B1 | 2/2001 | Leal |
| 6,192,362 | B1 | 2/2001 | Schneck et al. |
| 6,256,623 | B1 | 7/2001 | Jones |

(Continued)

FOREIGN PATENT DOCUMENTS

EP 1 019 856 A1 7/2000

(Continued)

OTHER PUBLICATIONS

Author unknown, "Digital Rum: Digital Rum And Webraska Collaborate To Deliver Proximity Shopping Services To Mobile Operators; New Applications Will Allow Customers To Pinpoint High Street Deals Via Mobile Phones," M2 Presswire, Coventry (UK), Apr. 30, 2001.*

*Primary Examiner*—Jeffrey A. Smith
*Assistant Examiner*—Amee A Shah
(74) *Attorney, Agent, or Firm*—Bell, Boyd & Lloyd LLP

(57) ABSTRACT

Methods and apparatus to anonymously request bids from a geographically centered plurality of vendors. The methods and apparatus enable a plurality of vendors to enter line card information (e.g., part numbers) and geographical information (e.g., zip codes) into a central database via a web page. Customers may then search for vendors in their area. The process automatically expands the geographical search area until a customer determined quantity of vendors are found. An anonymous e-mail message (i.e., a message not disclosing customer identity) is then sent to each selected vendor. The e-mail message preferably includes a hyperlink to a web page related to the customer request. Interested vendors may then supply vendor related information (e.g., price and delivery). If the customer locates a vendor able to meet the customer's needs, the customer may select the vendor to complete the purchase via the broker server.

60 Claims, 17 Drawing Sheets

U.S. PATENT DOCUMENTS

| | | |
|---|---|---|
| 6,275,821 B1 | 8/2001 | Danish et al. |
| 6,285,986 B1 | 9/2001 | Andrews |
| 6,324,534 B1 | 11/2001 | Neal et al. |
| 6,327,588 B1 | 12/2001 | Danish et al. |
| 6,341,270 B1 * | 1/2002 | Esposito et al. ............... 705/26 |
| 6,351,706 B1 | 2/2002 | Morimoto et al. |
| 6,370,510 B1 | 4/2002 | McGovern et al. |
| 6,381,597 B1 | 4/2002 | Lin |
| 6,393,436 B1 | 5/2002 | Vaimberg-Araujo |
| 6,396,842 B1 | 5/2002 | Rochberger |
| 6,421,680 B1 | 7/2002 | Kumhyr et al. |
| 6,438,539 B1 | 8/2002 | Korolev et al. |
| 6,505,164 B1 | 1/2003 | Brunsting et al. |
| 6,507,837 B1 | 1/2003 | De La Huerga |
| 6,510,406 B1 | 1/2003 | Marchisio |
| 6,523,021 B1 | 2/2003 | Monberg et al. |
| 6,556,226 B2 | 4/2003 | Gould et al. |
| 6,564,214 B1 | 5/2003 | Bhide |
| 6,584,462 B2 | 6/2003 | Neal et al. |
| 6,615,184 B1 | 9/2003 | Hicks |
| 6,629,092 B1 | 9/2003 | Berke |
| 6,631,367 B2 | 10/2003 | Teng et al. |
| 6,633,903 B1 | 10/2003 | Gould |
| 6,643,661 B2 | 11/2003 | Polizzi et al. |
| 6,662,183 B2 | 12/2003 | Beyer |
| 6,665,640 B1 | 12/2003 | Bennett et al. |
| 6,691,112 B1 | 2/2004 | Siegel et al. |
| 6,694,314 B1 | 2/2004 | Sullivan et al. |
| 6,697,799 B1 | 2/2004 | Neal et al. |
| 6,697,808 B1 | 2/2004 | Hurwood et al. |
| 6,704,748 B1 | 3/2004 | Suganuma |
| 6,708,162 B1 | 3/2004 | Morgan et al. |
| 6,735,520 B2 | 5/2004 | Nozaki |
| 6,751,597 B1 | 6/2004 | Brodsky et al. |
| 6,754,636 B1 | 6/2004 | Walker et al. |
| 7,197,475 B1 * | 3/2007 | Lorenzen et al. ............... 705/26 |
| 2001/0037332 A1 | 11/2001 | Miller et al. |
| 2001/0049826 A1 | 12/2001 | Wilf |
| 2001/0050911 A1 | 12/2001 | Eastman |
| 2001/0054008 A1 | 12/2001 | Miller et al. |
| 2002/0013778 A1 | 1/2002 | Neal et al. |
| 2002/0016804 A1 | 2/2002 | Wasilewski |
| 2002/0019786 A1 | 2/2002 | Gonzalez et al. |
| 2002/0022963 A1 | 2/2002 | Miller et al. |
| 2002/0023158 A1 | 2/2002 | Polizzi et al. |
| 2002/0029168 A1 | 3/2002 | McConnell, Jr. et al. |
| 2002/0032611 A1 | 3/2002 | Khan |
| 2002/0038266 A1 | 3/2002 | Tuttrup et al. |
| 2002/0040324 A1 | 4/2002 | Dunning et al. |
| 2002/0040338 A1 | 4/2002 | Sick et al. |
| 2002/0042789 A1 | 4/2002 | Michalewicz et al. |
| 2002/0046073 A1 | 4/2002 | Indseth et al. |
| 2002/0055888 A1 | 5/2002 | Beran et al. |
| 2002/0059111 A1 | 5/2002 | Ding et al. |
| 2002/0059204 A1 | 5/2002 | Harris |
| 2002/0065857 A1 | 5/2002 | Michalewicz et al. |
| 2002/0072981 A1 | 6/2002 | Park et al. |
| 2002/0073115 A1 | 6/2002 | Davis |
| 2002/0082912 A1 | 6/2002 | Batachia et al. |
| 2002/0083039 A1 | 6/2002 | Ferrari et al. |
| 2002/0083062 A1 | 6/2002 | Neal et al. |
| 2002/0087505 A1 | 7/2002 | Smith et al. |
| 2002/0087522 A1 * | 7/2002 | MacGregor et al. ............ 707/3 |
| 2002/0099605 A1 | 7/2002 | Weitzman et al. |
| 2002/0103654 A1 | 8/2002 | Poltorak |
| 2002/0107718 A1 | 8/2002 | Morrill et al. |
| 2002/0107861 A1 | 8/2002 | Clendinning et al. |
| 2002/0111839 A1 | 8/2002 | Nayak et al. |
| 2002/0116287 A1 * | 8/2002 | Schubert et al. ............... 705/26 |
| 2002/0116349 A1 | 8/2002 | Batachia et al. |
| 2002/0133369 A1 | 9/2002 | Johnson |
| 2002/0133387 A1 | 9/2002 | Wilson et al. |
| 2002/0143744 A1 | 10/2002 | Teng et al. |
| 2002/0143759 A1 | 10/2002 | Yu |
| 2002/0147715 A1 | 10/2002 | Beyer |
| 2002/0152199 A1 | 10/2002 | Teng et al. |
| 2002/0156763 A1 | 10/2002 | Marchisio |
| 2002/0178002 A1 | 11/2002 | Boguraev et al. |
| 2002/0194168 A1 | 12/2002 | Min et al. |
| 2003/0004936 A1 | 1/2003 | Grune et al. |
| 2003/0014428 A1 | 1/2003 | Mascarenhas |
| 2003/0018607 A1 | 1/2003 | Lennon et al. |
| 2003/0018621 A1 | 1/2003 | Steiner et al. |
| 2003/0020749 A1 | 1/2003 | Abu-Hakima et al. |
| 2003/0028530 A1 | 2/2003 | Nagaraja |
| 2003/0046132 A1 | 3/2003 | Keeley |
| 2003/0046311 A1 | 3/2003 | Baidya et al. |
| 2003/0050924 A1 | 3/2003 | Faybishenko et al. |
| 2003/0050959 A1 | 3/2003 | Faybishenko et al. |
| 2003/0055723 A1 | 3/2003 | English |
| 2003/0055816 A1 | 3/2003 | Paine et al. |
| 2003/0055818 A1 | 3/2003 | Faybishenko et al. |
| 2003/0065774 A1 | 4/2003 | Steiner et al. |
| 2003/0074301 A1 | 4/2003 | Solomon |
| 2003/0078915 A1 | 4/2003 | Chaudhuri et al. |
| 2003/0083995 A1 | 5/2003 | Ramachandran et al. |
| 2003/0088715 A1 | 5/2003 | Chaudhuri et al. |
| 2003/0093409 A1 | 5/2003 | Weil et al. |
| 2003/0097357 A1 | 5/2003 | Ferrari et al. |
| 2003/0101085 A1 | 5/2003 | Butler, III et al. |
| 2003/0101172 A1 | 5/2003 | De La Huerga |
| 2003/0110158 A1 | 6/2003 | Seals |
| 2003/0120652 A1 | 6/2003 | Tifft |
| 2003/0126120 A1 | 7/2003 | Faybishenko et al. |
| 2003/0135582 A1 | 7/2003 | Allen et al. |
| 2003/0144916 A1 | 7/2003 | Mumm et al. |
| 2003/0149642 A1 | 8/2003 | Perkowski |
| 2003/0149688 A1 | 8/2003 | Maeno |
| 2003/0158839 A1 | 8/2003 | Faybishenko et al. |
| 2003/0172007 A1 | 9/2003 | Helmolt et al. |
| 2003/0177111 A1 | 9/2003 | Egendorf et al. |
| 2003/0212604 A1 | 11/2003 | Cullen, III |
| 2003/0217047 A1 | 11/2003 | Marchisio |
| 2003/0217052 A1 | 11/2003 | Rubenczyk et al. |
| 2003/0220858 A1 | 11/2003 | Lam et al. |
| 2003/0225756 A1 | 12/2003 | Liu |
| 2004/0015485 A1 | 1/2004 | Salerno et al. |
| 2004/0019528 A1 | 1/2004 | Broussard et al. |
| 2004/0019531 A1 | 1/2004 | Broussard et al. |
| 2004/0030675 A1 | 2/2004 | Could |
| 2004/0030677 A1 | 2/2004 | Young-Lai |
| 2004/0030682 A1 | 2/2004 | Porter et al. |
| 2004/0030690 A1 | 2/2004 | Teng et al. |
| 2004/0030741 A1 | 2/2004 | Wolton et al. |
| 2004/0044582 A1 | 3/2004 | Chowdhary et al. |
| 2004/0054679 A1 | 3/2004 | Ralston |
| 2004/0054691 A1 | 3/2004 | Sharma et al. |
| 2004/0059728 A1 | 3/2004 | Miller et al. |
| 2004/0068462 A1 | 4/2004 | Katz et al. |
| 2004/0068477 A1 | 4/2004 | Gilmour et al. |
| 2004/0078224 A1 | 4/2004 | Schramm-Apple et al. |
| 2004/0083119 A1 | 4/2004 | Schunder et al. |
| 2004/0088178 A1 | 5/2004 | Zerza et al. |
| 2004/0088283 A1 | 5/2004 | Lissar et al. |
| 2004/0117465 A1 | 6/2004 | Bodin et al. |
| 2004/0117848 A1 | 6/2004 | Karaoguz et al. |
| 2004/0225600 A1 * | 11/2004 | Onodera et al. ............... 705/38 |
| 2005/0010484 A1 * | 1/2005 | Bohannon et al. ............. 705/26 |

FOREIGN PATENT DOCUMENTS

| | | |
|---|---|---|
| EP | 1 077 418 A2 | 2/2001 |
| EP | 1 096 392 A2 | 5/2001 |
| EP | 1 126 422 A2 | 8/2001 |

| | | | | | | |
|---|---|---|---|---|---|---|
| EP | 1197888 A1 * | 4/2002 | | WO | WO 01/61540 A1 | 8/2001 |
| EP | 0 792 491 B1 | 2/2003 | | WO | WO 01/61568 A2 | 8/2001 |
| EP | 1 320 042 A2 | 6/2003 | | WO | WO 01/63523 A1 | 8/2001 |
| WO | WO 96/12238 A1 | 2/1998 | | WO | WO 01/67732 A2 | 9/2001 |
| WO | WO 99/12116 A1 | 3/1999 | | WO | WO 01/73638 A1 | 10/2001 |
| WO | WO 00/14648 A1 | 3/2000 | | WO | WO 01/82117 A1 | 11/2001 |
| WO | 0025190 | 5/2000 | | WO | WI 01/99020 A1 | 12/2001 |
| WO | WO 00/30004 | 5/2000 | | WO | WO 01/97151 A1 | 12/2001 |
| WO | WO 00/30005 A1 | 5/2000 | | WO | WO 02/08946 A2 | 1/2002 |
| WO | WO 00/41116 A2 | 7/2000 | | WO | WO 02/10981 A2 | 2/2002 |
| WO | WO 00/42544 A2 | 7/2000 | | WO | WO 02/11022 A2 | 2/2002 |
| WO | WO 00/45319 A1 | 8/2000 | | WO | WO 02/27536 A1 | 4/2002 |
| WO | WO 00/51051 A1 | 8/2000 | | WO | WO 02/27601 A2 | 4/2002 |
| WO | WO 00/52404 | 9/2000 | | WO | WO 02/29668 A1 | 4/2002 |
| WO | WO 00/55787 A2 | 9/2000 | | WO | WO 02/42925 A1 | 5/2002 |
| WO | WO 00/57332 A2 | 9/2000 | | WO | WO 02/052377 A2 | 7/2002 |
| WO | WO 00/60502 A1 | 10/2000 | | WO | WO 02/091107 A2 | 11/2002 |
| WO | WO 00/60518 A1 | 10/2000 | | WO | WO 02/091238 A2 | 11/2002 |
| WO | WO 00/60519 A1 | 10/2000 | | WO | WO 02/091239 A2 | 11/2002 |
| WO | WO 00/73942 A2 | 12/2000 | | WO | WO 02/091241 A2 | 11/2002 |
| WO | WO 00/77691 A1 | 12/2000 | | WO | WO 02/091243 A1 | 11/2002 |
| WO | WO 01/01313 A2 | 1/2001 | | WO | WO 02/103578 A1 | 12/2002 |
| WO | WO 01/11531 A1 | 2/2001 | | WO | WO 03/003254 A1 | 1/2003 |
| WO | WO 01/16765 A1 | 3/2001 | | WO | WO 03/005240 A1 | 1/2003 |
| WO | WO 01/20514 A1 | 3/2001 | | WO | WO 03/009082 A2 | 1/2003 |
| WO | WO 01/31485 A2 | 3/2001 | | WO | WO 03/025712 A2 | 3/2003 |
| WO | WO 01/26018 A2 | 4/2001 | | WO | WO 03/027902 A1 | 4/2003 |
| WO | WO 01/27815 A1 | 4/2001 | | WO | WO 03/042873 A1 | 5/2003 |
| WO | WO 01/29683 A1 | 4/2001 | | WO | WO 03/091910 A2 | 11/2003 |
| WO | WO 01/32767 A2 | 5/2001 | | WO | WO 03/096249 A2 | 11/2003 |
| WO | WO 01/35280 A1 | 5/2001 | | WO | WO 03/102808 A1 | 12/2003 |
| WO | WO 01/35356 A1 | 5/2001 | | WO | WO 2004/027653 A2 | 4/2004 |
| WO | WO 01/37134 A1 | 5/2001 | | WO | WO 2004/034236 A2 | 4/2004 |
| WO | WO 01/37540 A2 | 5/2001 | | WO | WO 2004/036460 A2 | 4/2004 |
| WO | WP 01/46868 A2 | 6/2001 | | WO | WO 2001/090947 A1 | 6/2004 |
| WO | WO 01/52110 A2 | 7/2001 | | WO | WO 2004/049098 A2 | 6/2004 |
| WO | WO 01/59546 A2 | 8/2001 | | | | |

* cited by examiner

Welcome Customer!    ▼Back

IPF

First Time Vender Registration Form:
*means the field is required

*Customer ID — 1102
*Password — 1104
(min. 6 character)
*Re-Type Password — 1104
*Email Address — 1106
(use a valid email)
*Company Name — 1108
*Phone Number — 1110
*Contact First Name — 1112
*Contact Last Name — 1114
*Address 1 — 1116
Address 2 — 1116
*City — 1118
County — 1120
State [Select State] — 1122
Province
*Zip Code — 1124
Country: [United Sates] — 1126
Condition: — 1128
☐ New ☐ Used ☐ Reconditioned ⎫
☐ Installation Setup ☐ Vendor Site ⎬ 1130
☐ Service ☐ Customer Site Service ⎭

METHODS AND APPARATUS FOR ANONYMOUSLY REQUESTING BIDS FROM A CUSTOMER SPECIFIED QUANTITY OF LOCAL VENDORS WITH AUTOMATIC GEOGRAPHIC EXPANSION

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Many businesses rely on machinery. When that machinery fails, it must be quickly replaced or repaired to maximize the profits of the business. Locating a vendor that can provide the needed repair service, provide a replacement machine, and/or provide a needed replacement part can be burdensome.

Currently, businesses with equipment in need of repair rely on telephone directories and/or Internet search engines to locate a vendor. However, telephone directories and existing Internet search engines suffer from certain drawbacks.

Telephone directories do not indicate which vendor currently stocks the needed equipment or parts. In addition, telephone directories do not list prices and other information needed to locate a suitable vendor. As a result, a time consuming effort is needed to call each vendor to gather this type of information.

Customers may use an Internet search engine and/or electronic mail to locate vendors. However, customers often prefer to do business with the closest vendor that can fix the problem. In addition, customers often want to receive multiple bids for a particular job, and the customer may not know how far the search must be expanded in order to find a suitable quantity of vendors. Also, customers are often reluctant to use electronic mail to contact vendors for fear of burdensome follow up calls and e-mails from the vendors. Therefore, there is a need to overcome each of these drawbacks, and there is a need to provide technological advancements to facilitate the location of vendors.

SUMMARY

In general, the methods and apparatus described herein allow a user to anonymously request bids from a geographically centered plurality of vendors. The disclosed system allows a plurality of vendors to enter a product description or line card information (e.g., part numbers) and geographical information (e.g., zip codes) into a central database via a web page. Customers may then search for vendors of needed parts in their area. The process automatically expands the geographical search area until a customer determined quantity of vendors are found. An anonymous e-mail message (i.e., no customer identifiers) is then sent to each selected vendor. The e-mail message preferably includes a hyperlink to a web page related to the customer request. Interested vendors may then supply vendor related information (e.g., price and delivery). If the customer locates a vendor able to meet the customer's needs, the customer may select the vendor to complete the purchase via a broker server.

BRIEF DESCRIPTION OF THE DRAWINGS

FIG. 8 is an example of a vendor registration web page.

FIG. 11 is an example of a customer registration web page.

DETAILED DESCRIPTION OF EXEMPLARY EMBODIMENTS

Figure 1:
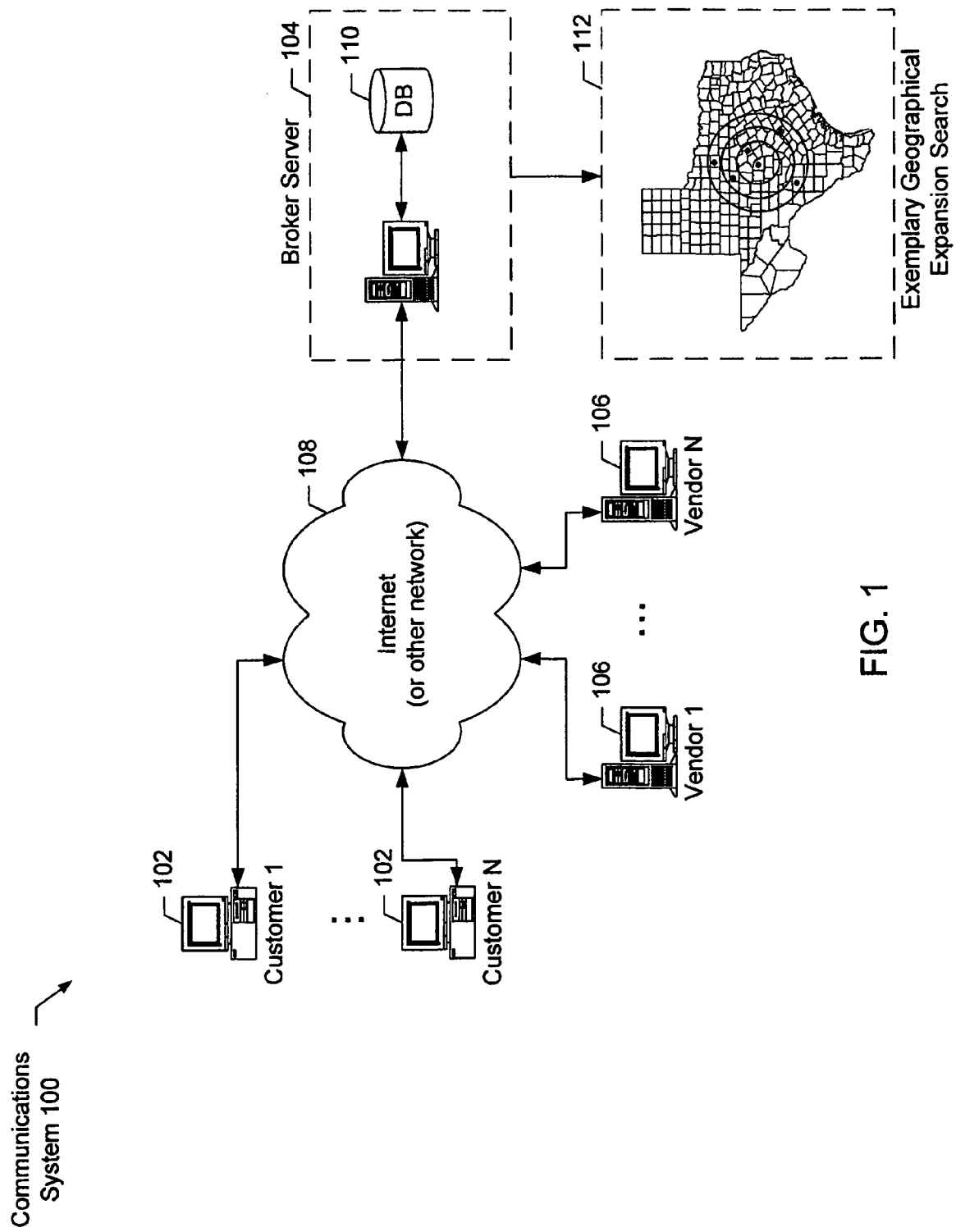
FIG. 1 is a high level block diagram of a communications system.

A high level block diagram of an exemplary network communications system 100 is illustrated in FIG. 1. The illustrated system 100 includes one or more customer computers 102, one or more broker servers 104, and one or more vendor computers 106. Each of these devices may communicate with each other via a connection to one or more communications channels 108 such as the Internet or some other data network, including, but not limited to, any suitable wide area network or local area network.

The broker server 104 stores a plurality of files, programs, and/or web pages in one or more databases 110 for use by the customer computers 102 and/or the vendor computers 106. The databases 110 may be connected directly to the broker server 104 and/or via one or more network connections. The databases 110 store customer and vendor information used by the broker server 104 to request bids from vendors 106 on behalf of customers 102. When locating vendors 106, the broker server 104 preferably performs a geographical expansion search 112 as described in detail below.

One server 104 may interact with a large number of customer computers 102 and vendor computers 106. Accordingly, each server 104 is typically a high end computer with a large storage capacity, one or more fast microprocessors, and one or more high speed network connections. Conversely, relative to a typical server 104, each customer computer 102 and each vendor computer 106 typically includes less storage capacity, a single microprocessor, and a single network connection.

Figure 2:
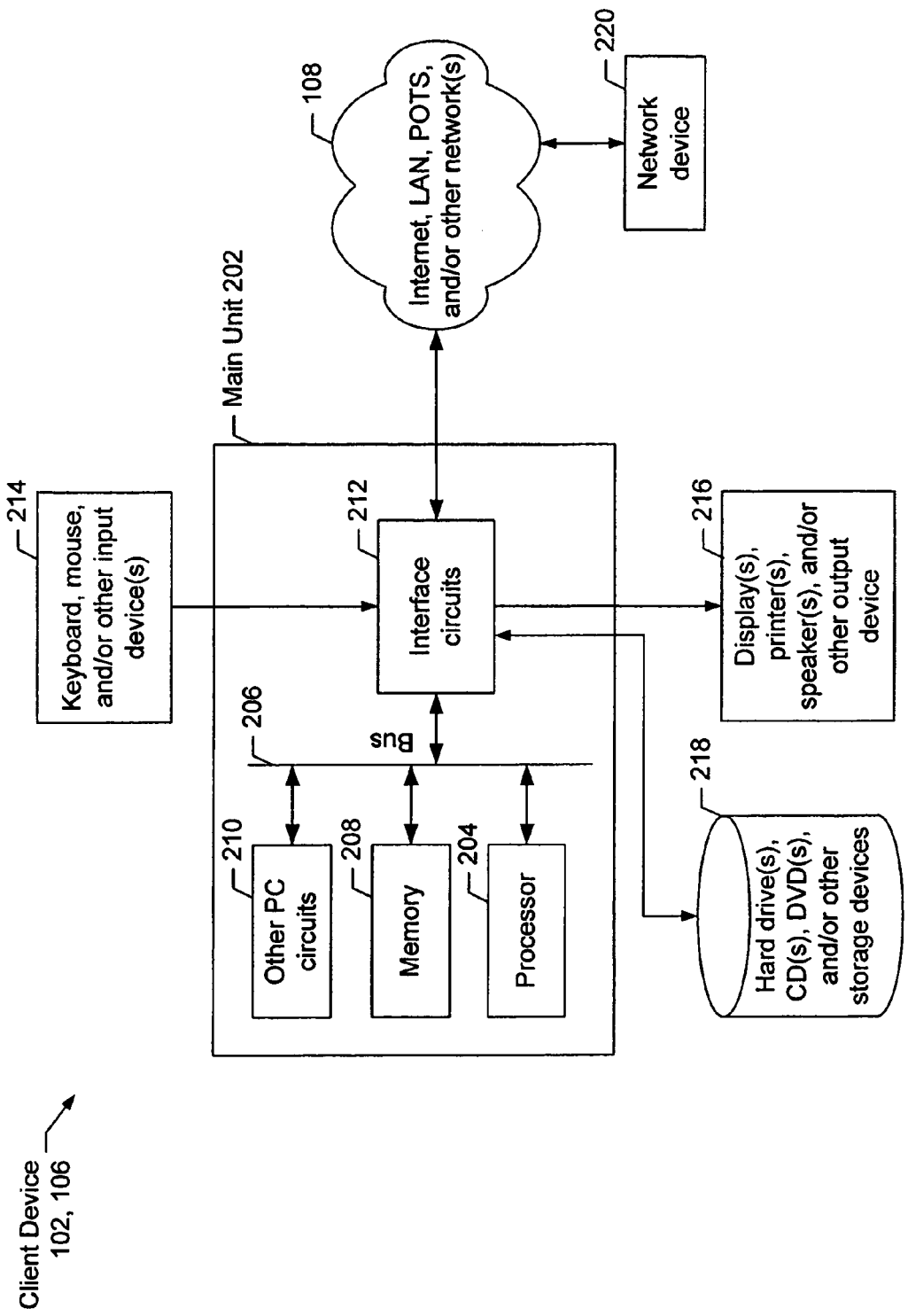
FIG. 2 is a more detailed block diagram showing one example of a client device.

A more detailed block diagram of a customer computer 102 is illustrated in FIG. 2. The client device 102 may include a personal computer (PC), a personal digital assistant (PDA e.g. a PALM PILOT® or other wired or wireless device), an Internet appliance, a cellular telephone, or any other suitable communication device. The customer computer 102 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors.

The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from a server 104, a vendor computer 106 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the customer computer 102. For example, the display 216 may be used to display web pages received from the server 104. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the customer computer 102.

The customer computer 102 may also exchange data with other network devices 220 via a connection to the network 108. The network connection may be any type of network connection, such as an Ethernet connection, digital subscriber line (DSL), telephone line, coaxial cable, etc. Users of the system 100 may be required to register with the server 104. In such an instance, each user may choose a user identifier (e.g., e-mail address) and a password which may be required for the activation of services. The user identifier and password may be passed across the network 108 using encryption built into the user's browser. Alternatively, the user identifier and/or password may be assigned by the server 104.

Figure 3:
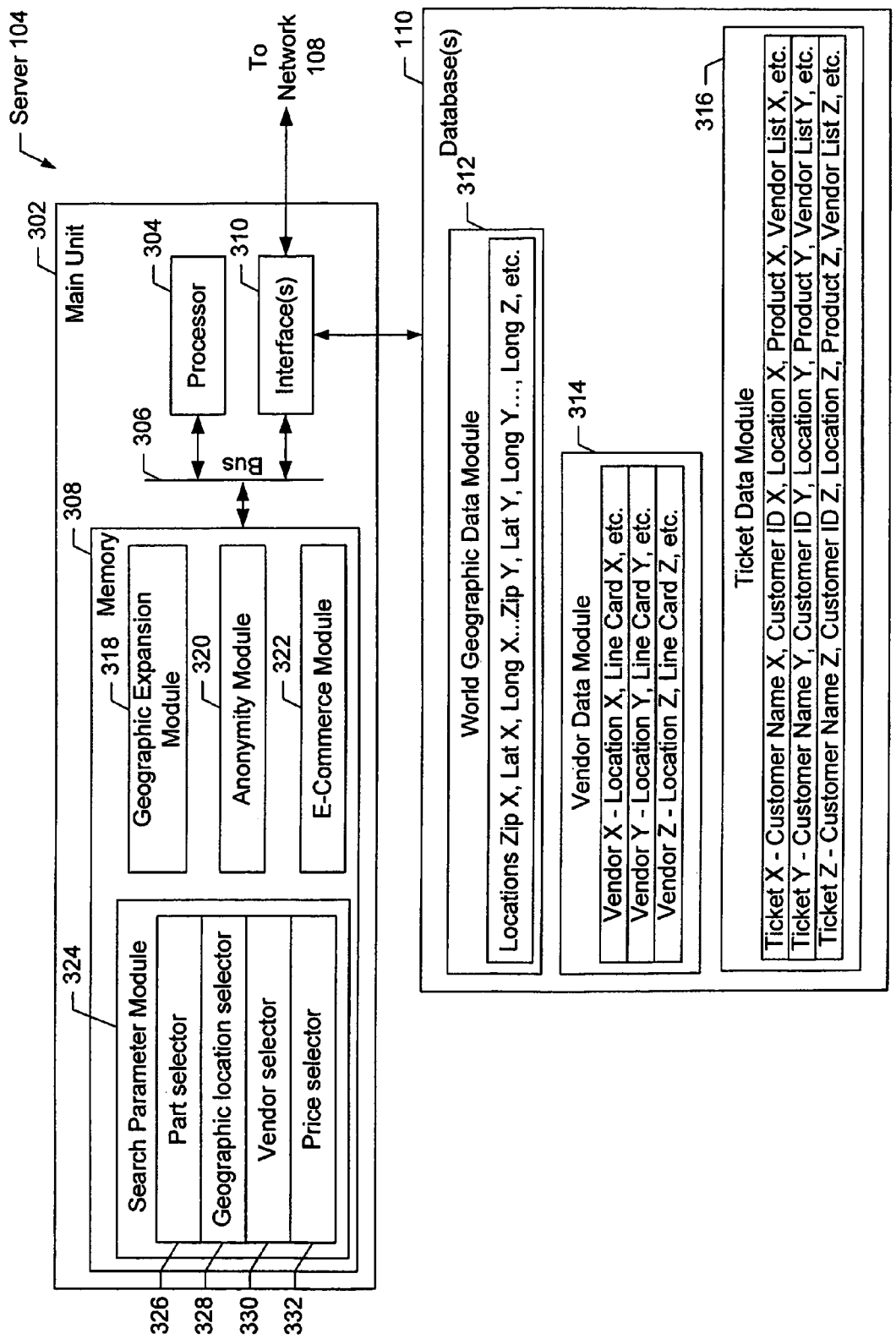
FIG. 3 is a more detailed block diagram showing one example of a server.

A more detailed block diagram of a server 104 is illustrated in FIG. 3. Like the customer computer 102, the main unit 302 in the server 104 preferably includes a processor 304 electrically coupled by an address/data bus 306 to a memory device 308 and a network interface circuit 310. The server 104 may exchange data with other devices via a connection to the network 108. The network interface circuit 310 may be implemented using any data transceiver, such as an Ethernet transceiver. The network 108 may be any type of network, such as a local area network (LAN) and/or the Internet.

The processor 304 may be any type of suitable processor, and the memory device 308 preferably includes volatile memory and non-volatile memory. Preferably, the memory device 308 stores computer code or a software program that implements all or part of the method described below. This program may be executed by the processor 304 in any suitable manner. However, some of the steps described in the method below may be performed manually or without the use of the server 104. The memory device 308 and/or a separate database 110 also store files, programs, web pages, etc. for use by other servers 104, vendor computers 106, and/or customer computers 102.

More specifically, the memory device 308 and/or the database(s) 110 preferably include a plurality of modules 312-332 which determine the overall functionality of the server 104. Each module includes a set of computer readable instructions and/or data which are related to a designated subject matter, topic or purpose. This type of modular construction of the server 104 can be created using any suitable computer programming language and/or database, including, without limitation, JAVA, C++, SQL, etc. Although certain example modules 312-332 are described herein, it should be appreciated that the modules 312-332 of the server 104 may be structured in other ways including as a single module. In such a case, the single module would have the functionality of the separate modules illustrated in FIG. 3.

In the illustrated example, the database(s) 110 include a world geographic data module 312, a vendor data module 314, and a customer account module or ticket data module 316. The illustrated memory device 308 includes a geographic expansion module 318, an anonymity module 320, an e-commerce module 322, and a search parameter module 324.

The world geographic data module 312 stores data related to geographic locations and the proximity of those geographic locations to one another. For example, the world geographic data module 312 may store a list of zip codes and global latitude/longitude coordinates associated with each zip code. The geographic expansion module 318 uses the data in the geographic data module 312 to determine one or more expansion areas from a given geographic location. For example, if the geographic expansion module 318 is given a first zip code and asked to determine the closer of a second zip code and a third zip code, the geographic expansion module 318 may determine the distance between the first zip code and the second zip code by using the global latitude/longitude coordinates associated with the first zip code and the second zip code. Similarly, the geographic expansion module 318 may determine the distance between the first zip code and the third zip code by using the global latitude/longitude coordinates associated with the first zip code and the third zip code. These two distances (1st zip to 2nd zip and 1st zip to 3rd zip) may then be compared to determine which distance is shorter.

The vendor data module 314 stores data related to a plurality of vendors 106 registered with the broker server 104. For example, the vendor data module 314 preferably stores location information associated with each vendor 106 (e.g., zip codes) and line card information associated with each vendor 106 (e.g., what types of products the vendor sells and what manufactures the vendor carries). The customer account module or ticket data module 316 stores information related to products/services requested by customers 102. For example, the ticket data module 316 preferably stores a customer name associated with each ticket number, a customer identifier associated with each ticket number, a desired delivery location (e.g., zip code) associated with each ticket number, and a product (e.g., part number) associated with each ticket number.

The search parameter module 324 uses the data in the vendor data module 314 and the ticket data module 316 to determine a vendor list for each ticket. In the illustrated example, the search parameter module 324 includes a part selector 326, a geographic location selector 328, a vendor selector 330, and a price selector 332. Of course, a person of ordinarily skill in the art will readily appreciate that the search parameter module 324 may include any number of sub-parts.

Figure 17:
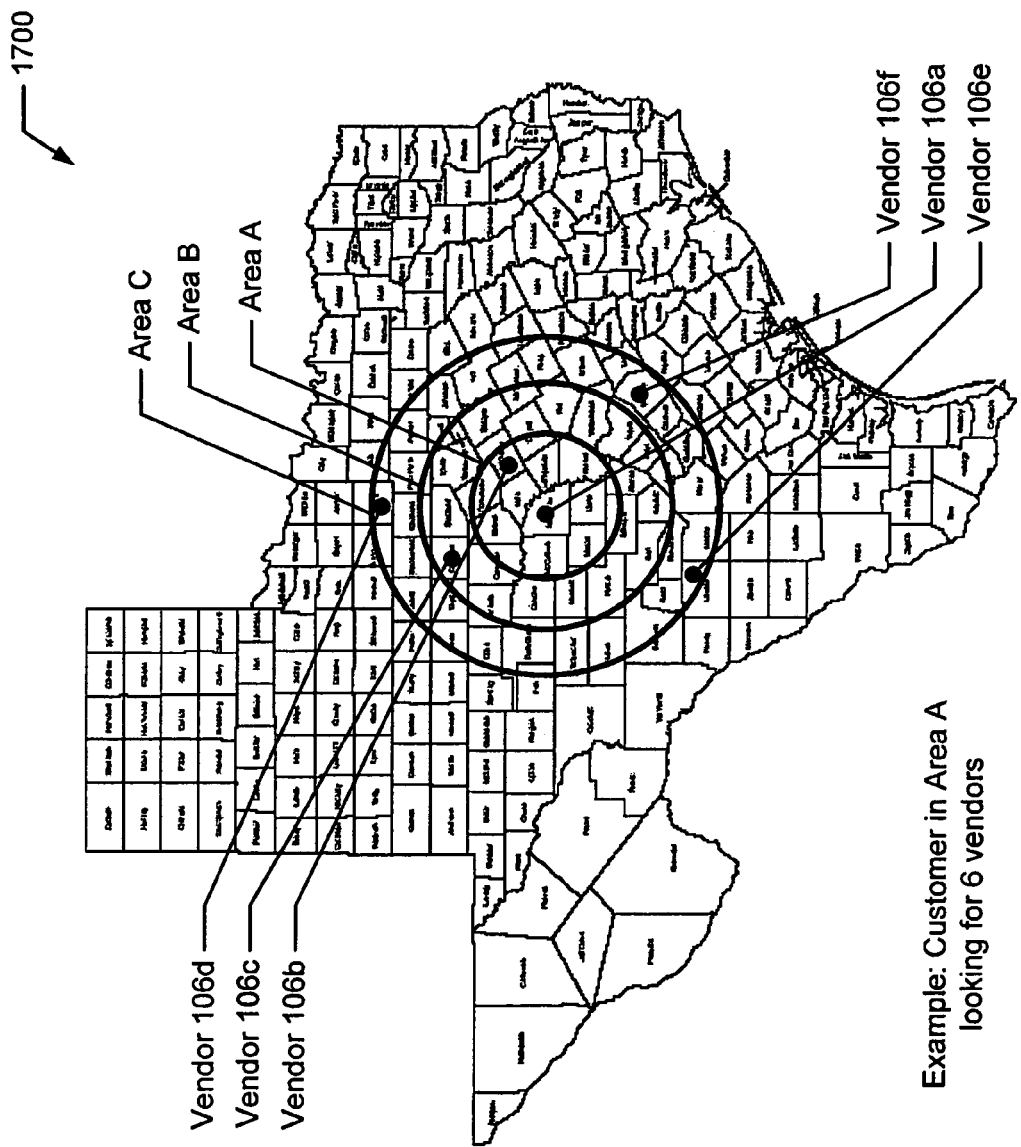
FIG. 17 is an example of a geographical expansion search.

The geographic location selector 328 and the vendor selector 330 work with the geographic expansion module 318 and the world geographic data 312 to automatically expand the geographical search area until a customer determined quantity of vendors 106 are found. For example, as illustrated in FIG. 17, a customer 102 in Area A of region 1700 (such as Texas) may request six vendors 106 that carry part number 123 manufactured by XYZ. Optionally, the part selector 326 may be used to cross reference one manufacture's part numbers with another manufacture's related part numbers. In the example of FIG. 17, only two vendors 106a and 106b that carry the requested part are available in Area A. As a result, the search is automatically expanded to Area B (to pick up one more vendor 106c) and then to Area C (to pick up three more vendors 106d, 106e and 106f for a total of six vendors 106).

Although part availability and geographic location are used to select vendors 106 in these examples, many other criteria may also be used. For example, a price selector 332 may be used to locate vendors 106 that carry a particular part at or below a customer entered price level. Even when additional criteria, such as price, are used to narrow the field of vendors 106 in a fashion that, the geographical expansion search 112 may still be used.

The anonymity module 320 coordinates communications between the customers 102 and the selected vendors 106 in a fashion that masks or conceals the customer's identity or contact information until the customer makes a purchase decision. The anonymity module 320 performs this function by using a customer alias or customer code. By including the customer code on all communications, the customer's name, identity and contact information is masked or otherwise excluded. The e-commerce module 322 handles electronic purchasing transactions such as adding parts to a ticket, processing credit cards, etc.

Figure 4:
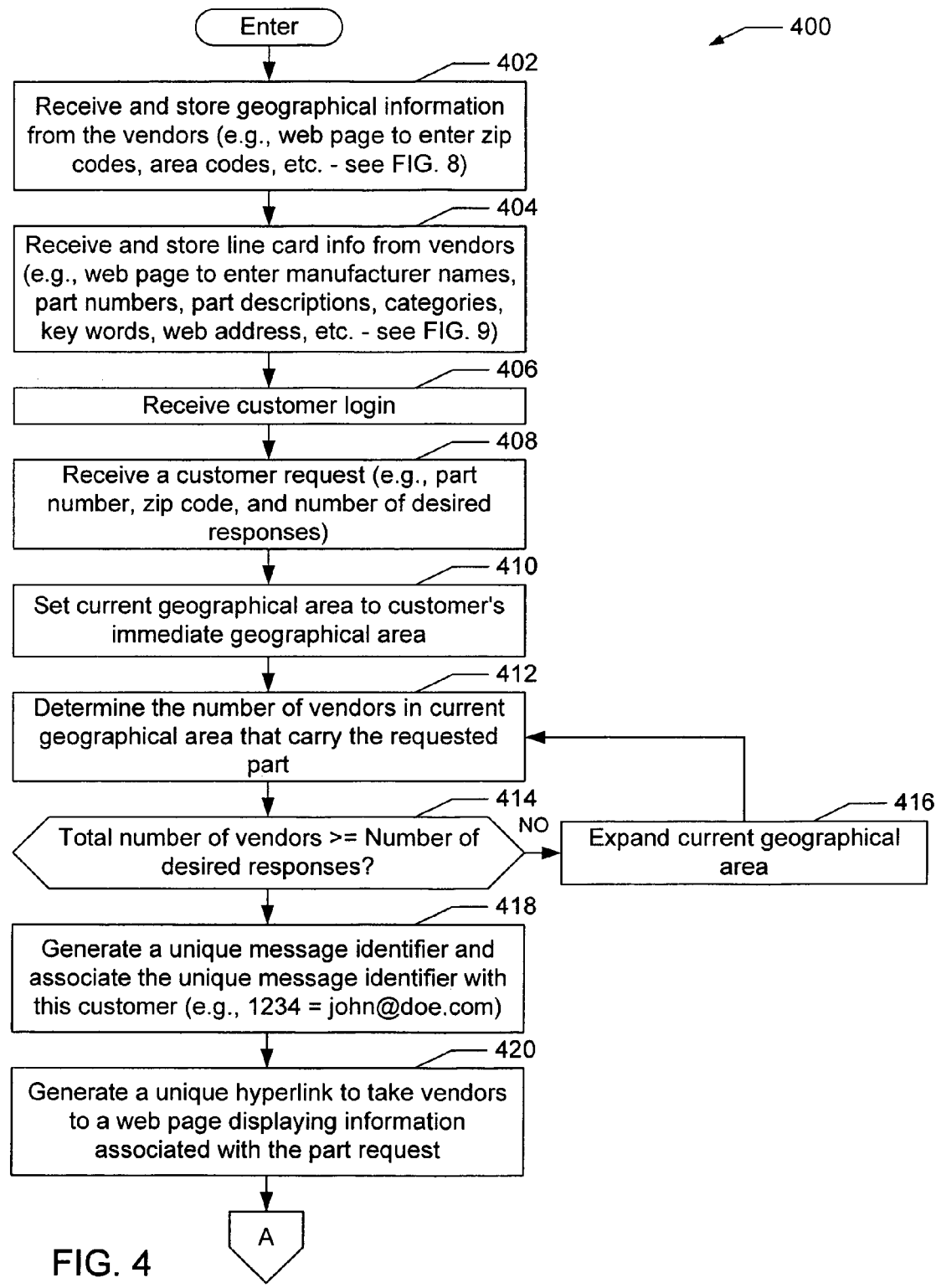
FIGS. 4-5 are a flowchart of an example process to anonymously request information from a geographically centered plurality of vendors.

A flowchart of an example process 400 for brokering equipment, parts and services is illustrated in FIG. 4. Preferably, the process 400 is embodied in one or more software programs which is stored in one or more memories and executed by one or more processors. Although the process 400 is described with reference to the flowchart illustrated in FIG. 4, a person of ordinary skill in the art will readily appreciate that many other methods of performing the acts associated with process 400 may be used. For example, the order of many of the steps may be changed, and many of the steps described are optional. In addition, although the examples used herein are directed to procuring or brokering replacement parts, a person of ordinary skill in the art will readily appreciate that the techniques disclosed herein may be applied to brokering other types of goods and services. For example, the techniques disclosed herein may be used to broker equipment and repair services.

Generally, the process 400 allows a plurality of vendors 106 to enter a product description or line card information (e.g., part numbers 1320) and geographical information (e.g., zip codes 1302) into a central database 110 via a web server 104. Customers 102 may then search for vendors 106 in their desired geographical area that carry the part they require. The process 400 automatically expands the geographical search area until a customer determined quantity of vendors 106 are found. An anonymous e-mail message (i.e., no customer identifiers) is then sent to each selected vendor 106. The e-mail message preferably includes a hyperlink to a web page related to the customer request. In this manner, the information associated with the transaction is kept centrally and distributed via the web server 104 without the need for the vendors 106 to periodically check the web server 104 to see if a request has come in. Interested vendors 106 may then supply vendor related information (e.g., price and delivery). If the customer 102 locates a vendor 106 able to meet the customer's needs, the customer 102 may select the vendor 106 to complete the purchase via the server 104.

The process 400 begins by receiving geographical information (e.g., zip codes 1302) and product information or line card information (e.g., part numbers 1320) from a plurality of vendors 106 (blocks 402 and 404). For example, a vendor 106 may use one or more web pages hosted on the broker server 104 to enter registration information such as an e-mail address, a postal address, a telephone number, etc. and line card information such as manufacture names, product lines, part numbers, brief part description, detailed part descriptions, categories, key words, etc. The products may be any type of products such as medical supplies, medical instruments, raw materials, etc. Similarly, the system may be used for any type of business transaction (e.g., business-to-business, business-to-consumer, consumer-to-business, etc.)

Figure 6:
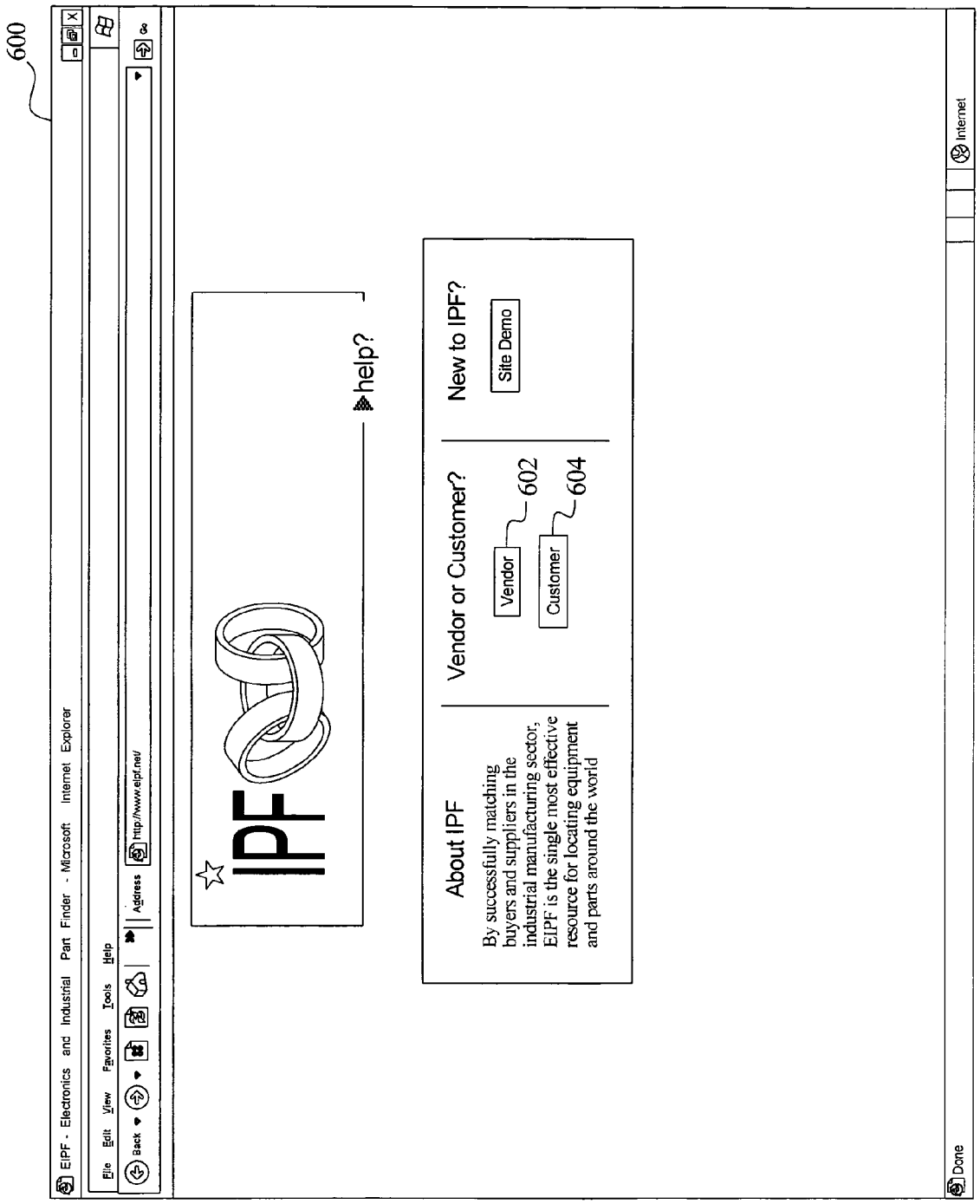
FIG. 6 is an example of a home page for a broker server.

An example home page 600 for the broker server 104 is illustrated in FIG. 6. In this example, the home page 600 includes a vendor input or button 602 and a customer input or button 604. A vendor needing to enter or modify line card information presses the vendor button 602.

Figure 7:
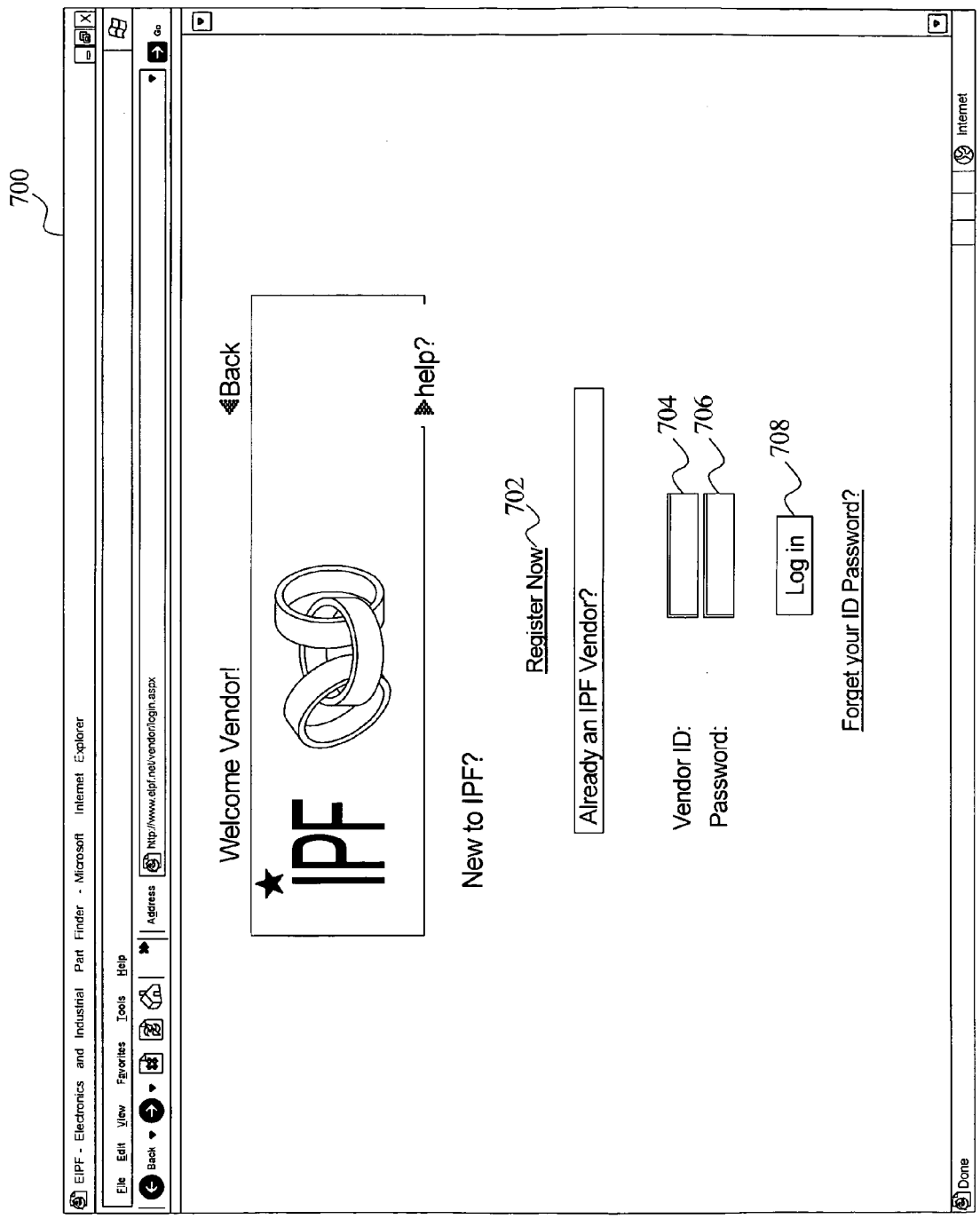
FIG. 7 is an example of a vendor login web page.

In response to the pressing of the vendor button 602, the broker server 104 transmits a vendor login page 700 to the vendor 106. An example of a vendor login page 700 is illustrated in FIG. 7. In this example, the vendor login page 700 includes a register now input or button 702, a vendor ID input box 704, a password input box 706, and a log in button 708. If the vendor 106 is already registered with the broker server 104, the vendor 106 enters his/her vendor ID in the vendor ID input box 704, enters his/her password in the password input box 706 and presses the log in button 708. If the vendor 106 is not registered with the broker server 104, the vendor 106 presses the register now button 702.

Figure 8:
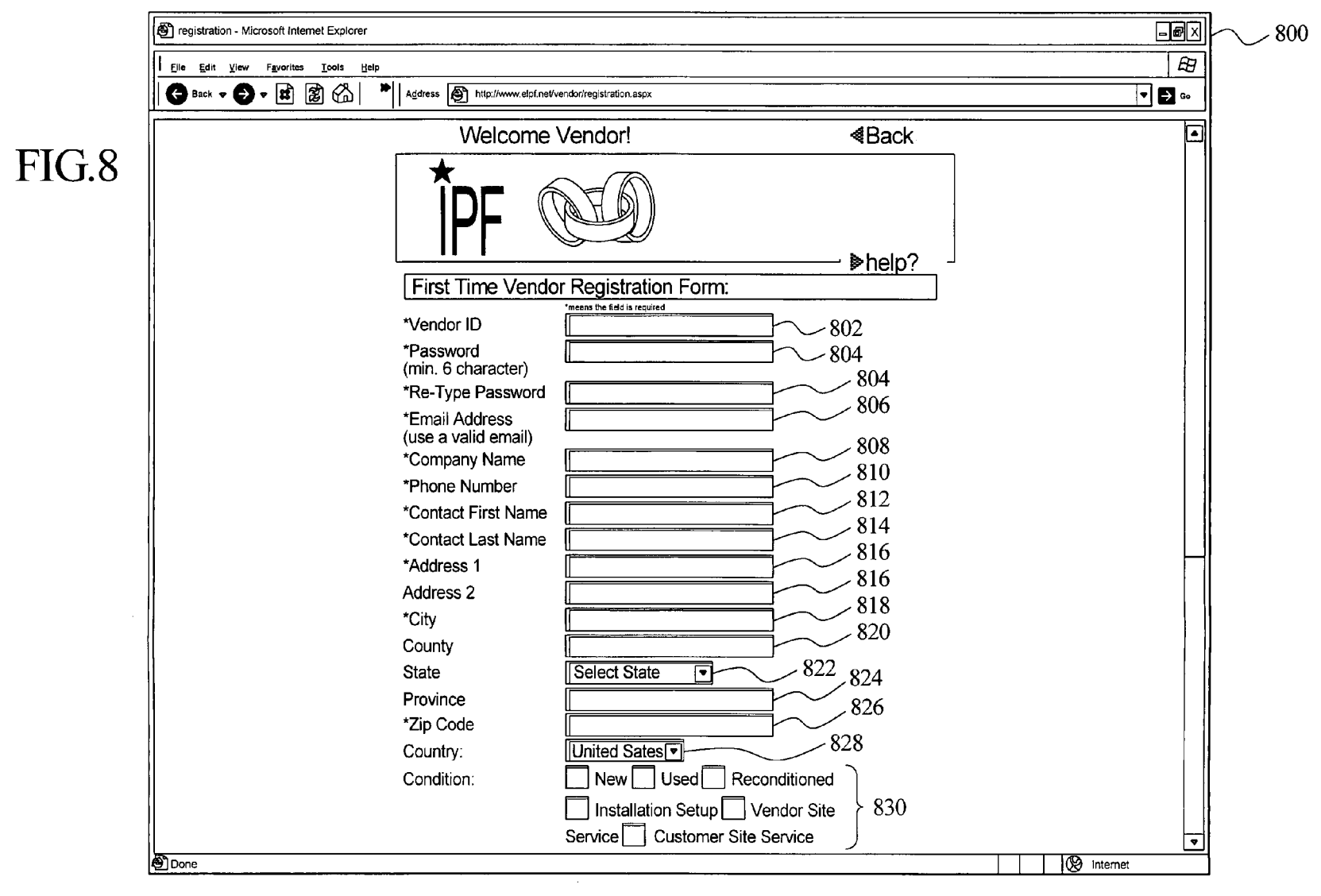

In response to the register now button 702, the broker server 104 transmits a vendor registration web page 800 to the vendor 106. An example of a vendor registration web page 800 is illustrated in FIG. 8. In this example, the new vendor 106 is asked to enter a vendor ID 802, a password 804, an e-mail address 806, a company name 808, a phone number 810, a first contact name 812, a last contact name 814, a postal address 816, a city 818, a county 820, a state 822, a province 824, a zip code 826, a country 828, and a part/equipment condition 830 In addition, the vendor 106 may be asked to enter a web site address, an after hours cell phone number, and credit card information (not shown). Several of these items of information may be used to determine a vendor's geographical location. For example, an area code portion of the phone number 810 and/or the postal zip code 826 may be used to define a geographical area associated with the vendor 106. Similarly, the postal address 816, city 818, county 820, state 822, province 824, and/or country 828 may be used to define a geographical area associated with the vendor 106.

The after hours cell phone number (or any other contact information such as a home phone number, home e-mail address, etc.) may be used to contact a vendor 106 after normal business hours. In addition, the broker server 104 may be programmed to contact (e.g., send an e-mail to) a vendor "on call." The vendor on call may rotate through a predetermined list of vendors 106. Of course, any contact information (e.g., phone number, cell phone number, e-mail address, etc.) may be used to contact a vendor 106 during normal business hours as well.

Figure 9:
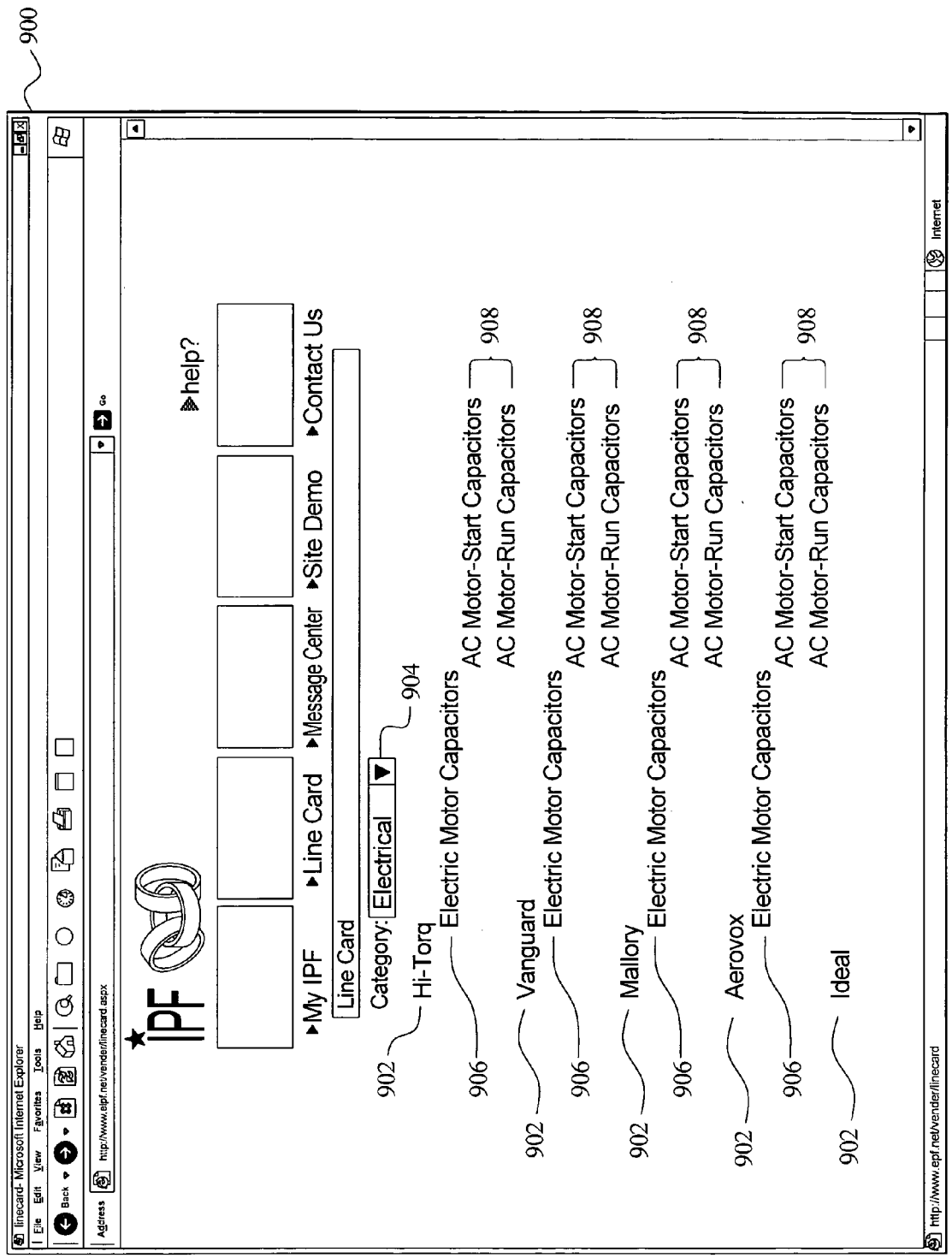
FIG. 9 is an example of a vendor line card web page.

Once a vendor 106 successfully registers or logs in, the vendor 106 may add or modify his/her line card information. An example of a vendor line card web page 900 is illustrated in FIG. 9. In this example, five different manufacture names 902 are shown. Each of these manufactures 902 are categorized under the electrical category 904. More specifically, each of these manufactures 902 is listed for this vendor 106 under a sub-category 906 using the key words "electric motor capacitors." Even more specifically, each of these manufactures 902 is listed for this vendor 106 under a sub-sub-category 908 using the key words "AC Motor—Start Capacitors" and the key words "AC Motor—Run Capacitors." When a customer 102 is searching for a vendor 106, the customer 102 may navigate a tree structure representing the categories, sub-categories, sub-sub-categories, etc., or the customer 102 may issue a text search for the key words used to describe each category, sub-category, sub-sub-category, etc.

Figure 10:
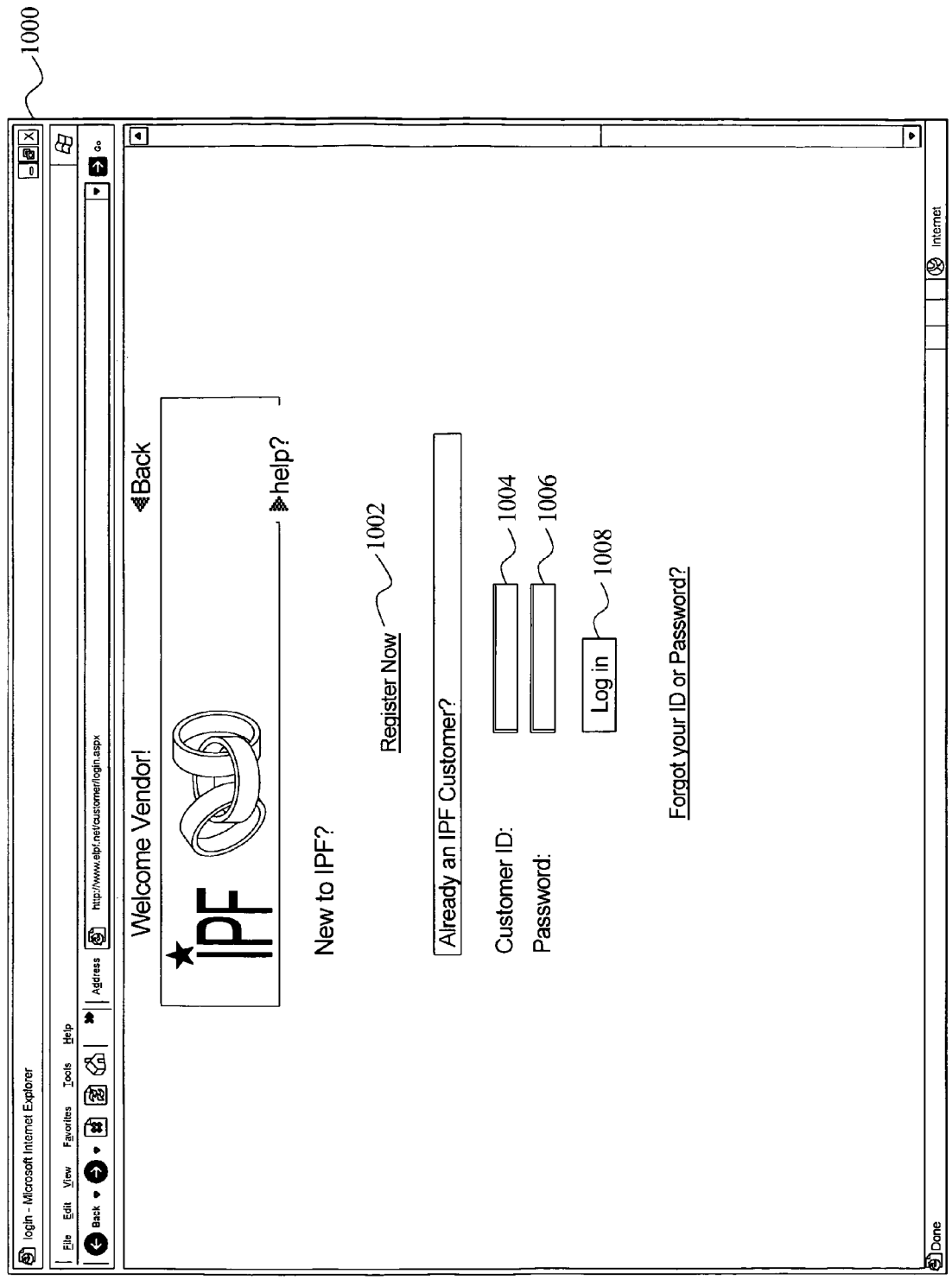
FIG. 10 is an example of a customer login web page.

Returning to FIG. 4, once one or more vendors 106 have entered their geographical and line card information, the process 400 receives login information from a customer 102 (block 406). Specially, in response to the customer button 604, the broker server 104 transmits a customer login page 1000 to the vendor 106. An example of a customer login page 1000 is illustrated in FIG. 10. In this example, the customer login page 1000 includes a register now button 1002, a customer ID input box 1004, a password input box 1006, and a log in button 1008. If the customer 102 is already registered with the broker server 104, the customer 102 enters his/her customer ID in the customer ID input box 1004, enters his/her password in the password input box 1006 and presses the log in button 1008. If the customer 102 is not registered with the broker server 104, the customer 102 presses the register now button 1002.

In response to the register now button 1002, the broker server 104 transmits a customer registration web page 1100 to the customer 102. An example of a customer registration web page 1100 is illustrated in FIG. 11. In this example, the new customer 102 is asked to enter a customer ID 1102, a password 1104, an e-mail address 1106, a company name 1108, a phone number 1110, a first contact name 1112, a last contact name 1114, a postal address 1116, a city 1118, a county 1120, a state 1122, a province 1124, a zip code 1126, a country 1128, a part/equipment condition 1130, and credit card information (not shown). Several of these items of information may be used to determine a customer's geographical location. For example, an area code portion of the phone number 1110 and/or the postal zip code 1126 may be used to define a geographical area associated with the customer 102. Similarly, the postal address 1116, city 1118, county 1120, state 1122, province 1124, and/or country 1128 may be used to define a geographical area associated with the customer 102.

Returning to FIG. 4, once a customer 102 successfully registers or logs in, the customer 102 may send a request to the server 104 to locate vendors 106 (block 408). For example, the customer 102 may enter a part number, his/her zip code, and the number of responses he/she would like to receive into a customer request web page 1100. The zip code may vary as the customer's location changes, and there may be a default zip code for each customer 102. In addition, the customer 102 may enter a maximum price he/she is willing to pay.

Figure 12:
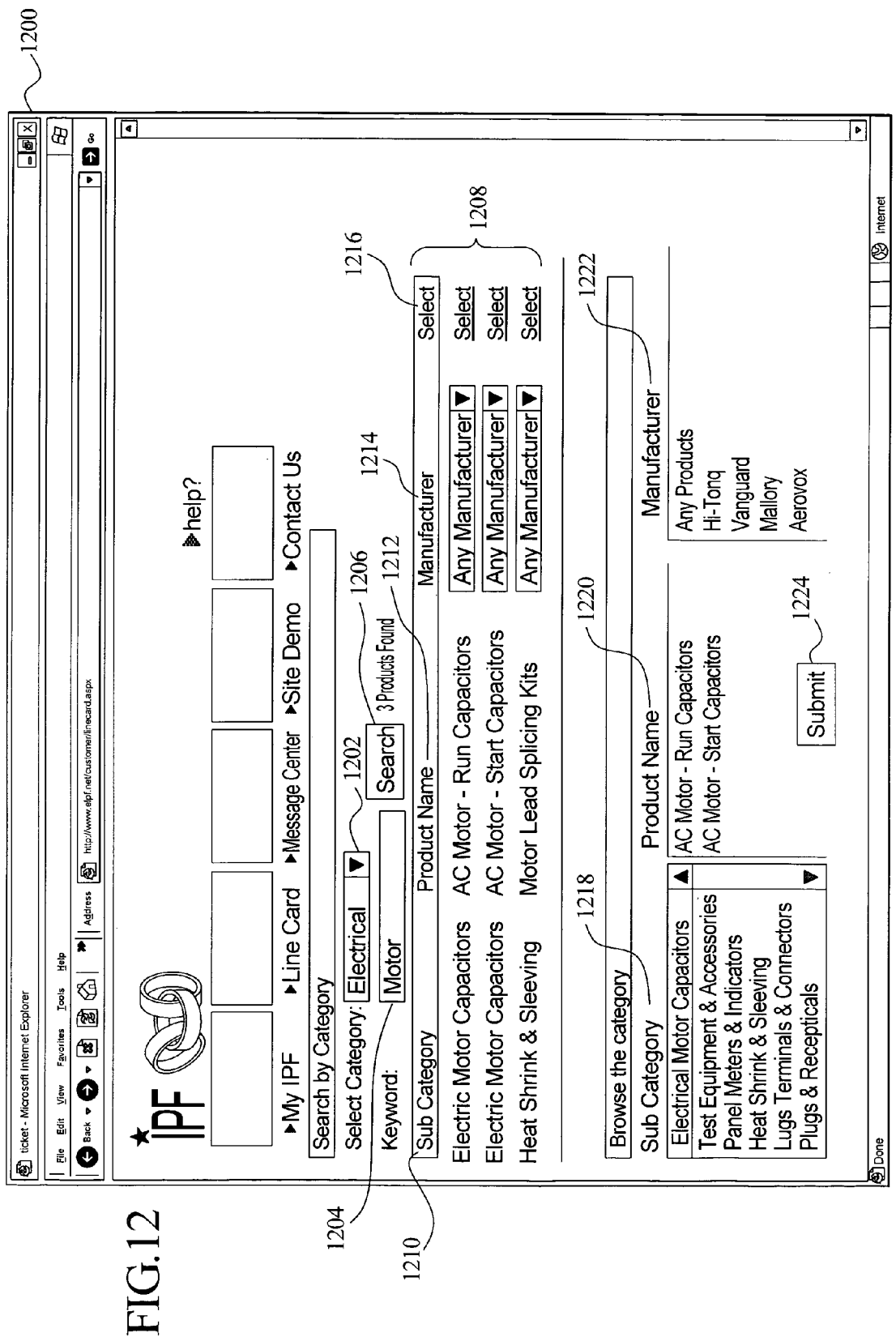
FIG. 12 is an example of a customer request web page.

An example of a customer request web page 1200 is illustrated in FIG. 12. In this example, the customer request web page 1200 includes a category selection drop-down box 1202, a keyword input box 1204, and a search button 1206. The customer 102 may select a category from the category selection drop-down box 1202 (e.g., Electrical), enter one or more keywords in the keyword input box 1204 (e.g., motor), and press the search button 1206 to locate one or more product/manufacturer selections 1208. Each of the product/manufacturer selections 1208 includes any number of sub-categories 1210, a product name 1212, a manufacturer drop down box 1214, and a select hyperlink 1216. Of course, throughout this description, any user selectable action that causes data to be transmitted and/or received may be used in place of a hyperlink. Alternatively, the customer 102 may manually select a sub-category 1218, a product name 1220, and a manufacturer 1222. In order to proceed to a ticket entry web page 1300, the customer 102 presses one of the select hyperlinks 1216 or a submit button 1224.

In an alternate embodiment, the categories and/or subcategories may lead the customer 102 from an application to one or more products and/or services specifically suited for that application. If the customer 102 is unsure of the product they need, the customer 102 can select "Application" on the system tool bar. The customer 102 is then prompted to choose a "Category" and or "Subcategory." The customer 102 then completes a questionnaire or chooses from a plurality of predetermined selections. This allows the system to automatically search for the best products or services to match the application at hand. For example, a customer requirement may fall into a range that a particular product is designed to address (e.g., a lubricant designed for water hardness between 5 grains and 9 grains works for a customer requirement of 7 grains). In this manner, exact matches may be used, but are not required. Accordingly, more products may be selected as compared to an exact matching system.

In certain applications, this information is sent to one or more vendors 106 that have the ability to apply one or more products and/or services to solve the customer's needs. For example, under a "lubricant" category, the customer 102 may select a "light duty machining" application and "cast iron" as the material. The system may then suggest the product "Hysol G 100" and/or allow the customer to view all products that match the selected category (e.g., "lubricant"), subcategory (e.g., application="light duty machining") and sub subcategory (e.g., material="cast iron"). In this manner, customers 102 are better served because incorrect product selections are minimized.

Figure 13:
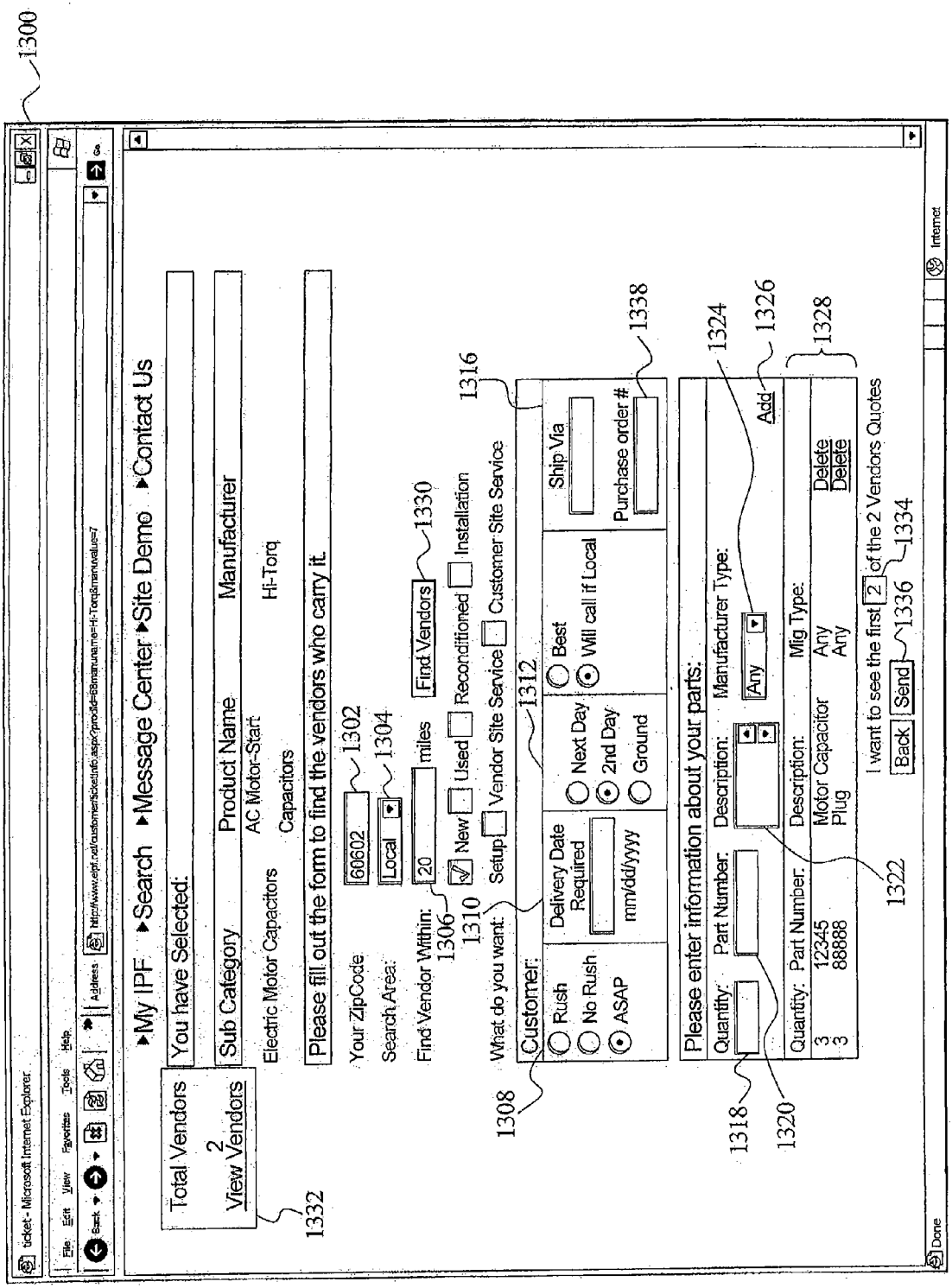
FIG. 13 is an example of a ticket entry web page.

An example of a ticket entry web page 1300 is illustrated in FIG. 13. In this example, the ticket entry web page 1300 includes the customer's zip code 1302, a requested search area 1304, and a distance restriction 1306. The customer's zip code 1302 is automatically filled in based on the customer's registration information. However, the default zip code may be replaced by the customer 102. The search area 1304 indicates the geographical areas to be searched for the vendor 106. For example, choices in the search area drop-down box 1304 may include local, city, sate, national, world, etc. The distance restriction 1306 also limits the geographical areas to be searched (e.g., 20 miles).

In addition, the ticket entry web page 1300 includes information associated with delivery such as a rush selection 1308, a required delivery date 1310, a preferred shipping type 1312, and a preferred carrier 1316. For example, the rush selection 1308 may include a rush option, a no rush option, and an as soon as possible (ASAP) option. The required delivery date 1310 may be any month-day-year combination. Examples of shipping types 1312 include next day, second day, and ground sipping. The preferred carrier 1316 may be any carrier such as FEDERAL EXPRESS, UPS, DHL, etc.

In addition, the ticket entry web page 1300 includes information associated with the part the customer 102 is seeking such as a quantity 1318 (e.g., 3), a part number 1320 (e.g., 12345), a description 1322 (e.g., Motor Capacitor), and a manufacturer type 1324 (e.g., specific manufacture(s) or "any"). In one embodiment, the broker server 104 cross references one manufacture name to another manufacture name that carries the same or similar product line (e.g., based on a mil spec). Each time the customer 102 enters this information and presses an add hyperlink 1326, the information is added to a parts list area 1328.

After the customer completes the ticket entry web page 1300, he/she may press a find vendors button 1330. The server 104 then generates a list of vendors 106 that match the criteria entered on the ticket entry web page 1300. The number of vendors 106 located and a view vendors hyperlink 1332 are then included on the ticket entry web page 1300. At this point, the customer 102 may modify any of the information on the ticket entry web page 1300 and press the find vendors button 1330 again, or the customer 102 may enter a quantity of desired responses 1334 and press a send button 1336.

Figure 14:
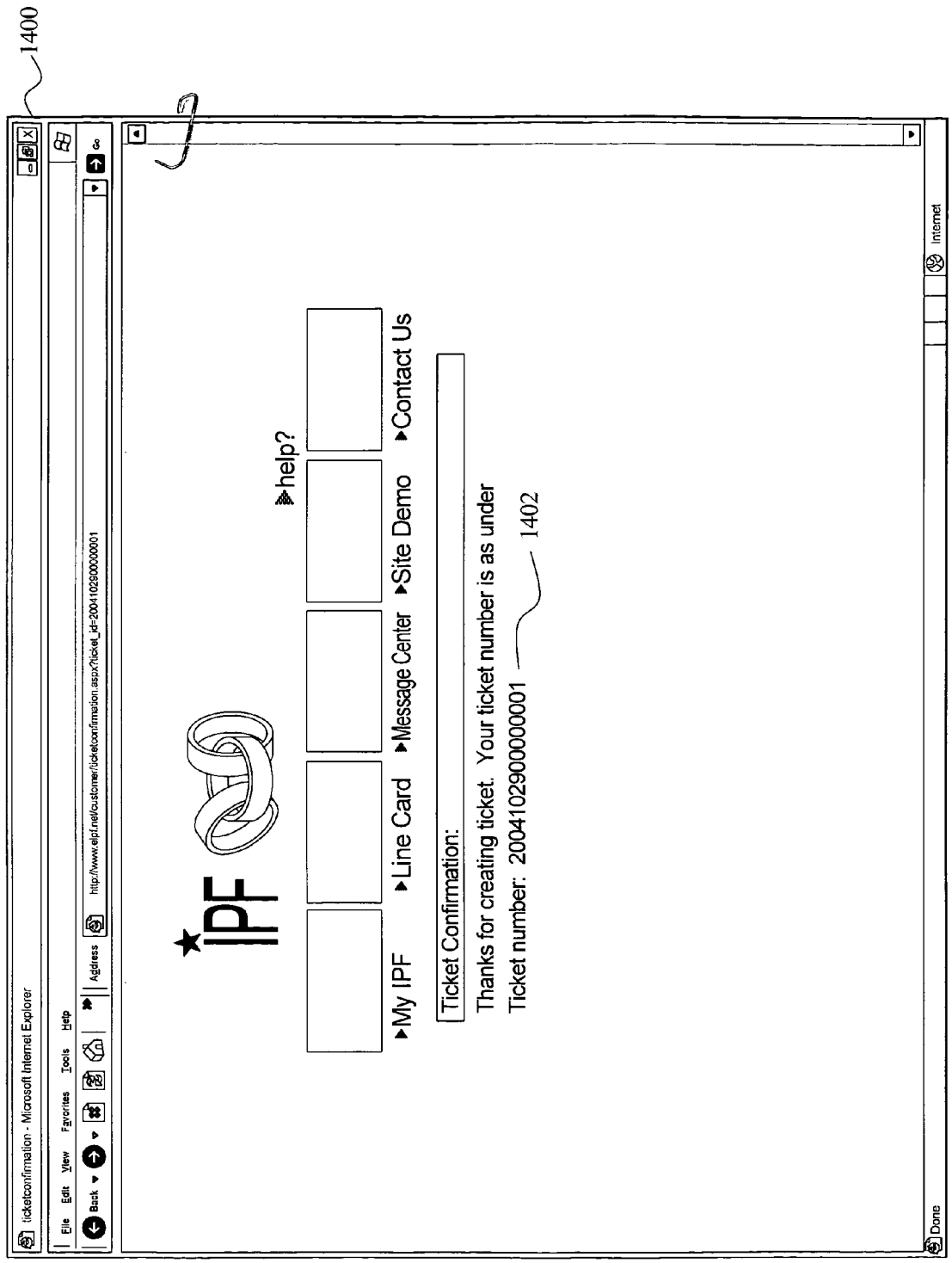
FIG. 14 is an example of a ticket confirmation web page.

When the customer presses the send button 1336 on the ticket entry web page 1300 of FIG. 13, the server 104 generates a ticket confirmation web page 1400 as shown in FIG. 14. The ticket confirmation web page 1400 includes a unique ticket number 1402. This unique ticket number is used to keep track of the information associated with the submitting customer 102 without revealing the identify of the customer 102 to the vendors 106 that receive the ticket.

Returning to FIG. 4, the process 400 then sets the current geographical area to the customer's immediate geographical area (block 410). For example, the server 104 may set the current geographical area to the customer's zip code 1302. Next, the process 400 determines the quantity of vendors 106 in the current geographical area that carry the requested part(s) (block 412). For example, the server 104 performs a database search to find all vendor's located in the same zip code 1302 as the customer 102 whose line cards match the information entered by the customer 102 in the ticket entry web page 1300. In one embodiment, the broker server 104 uses a list of preferred vendors associated with the customer 102 first. For example, the customer 102 may prefer to use vendors 106 where he/she already has an account setup.

The process 400 then checks if the total number of vendors 106 found so far is greater than or equal to the number of desired responses 1334 entered by the customer 102 (block 414). For example, the customer 102 may be looking for six responses, but only two vendors 106 with line cards that match the customer's request are located in the same zip code 1302 as the customer 102 (see FIG. 17). If the total number of vendors 106 found so far is not greater than or equal to the number of desired responses 1334, the process 400 automatically expands the current geographical area (block 416) and repeats the vendor search (block 412). For example, the server 104 may use a look up table to set the current geographical area to the customer's zip code 1302 and all the surrounding zip codes. In the example of FIG. 17, only two vendors 106 that carry the requested part are available in Area A. As a result, the search is automatically expanded to Area B (to pick up one more vendor 106) and then to Area C (to pick up two more vendors 106 for a total of six vendors 106).

Once a sufficient number of vendors 106 are located, the process 400 generates a unique message identifier and associates the unique message identifier with the customer 102 (block 418). For example, the server 104 may store the unique ticket number 1402 in the database 110 in association with the customer's email address 1106. In addition, the process 400 generates a unique hyperlink to take vendors 106 to a web page displaying information associated with the ticket number 1402 (block 420).

Figure 5:
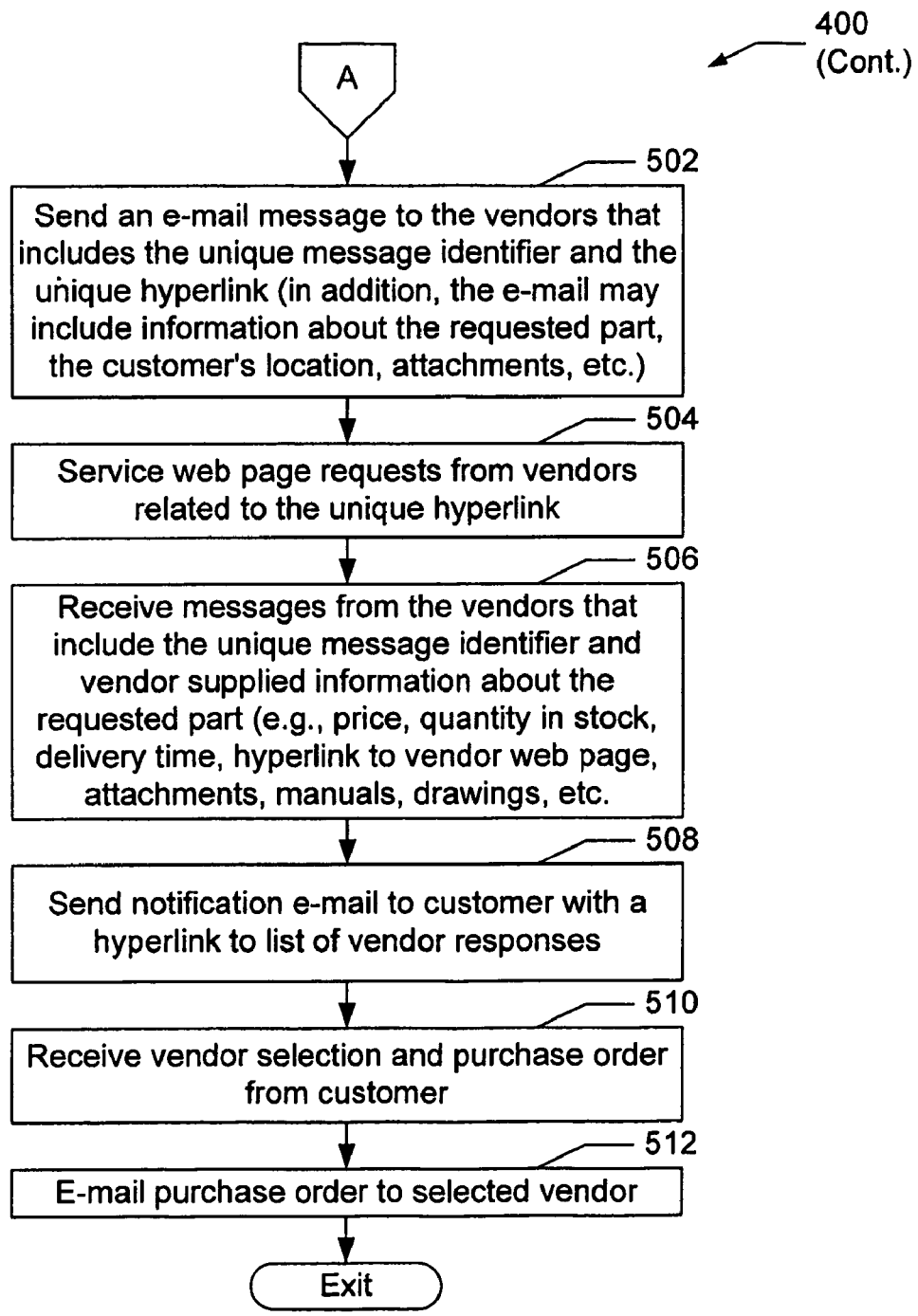

Turning to FIG. 5, the process 400 then sends an electronic message, such as an e-mail message, to the selected vendors 106 (block 502). Preferably, the e-mail message to the vendors 106 includes the unique message identifier (e.g., the ticket number 1402) and the unique hyperlink. In addition, the e-mail message to the vendors 106 may include some or all of the information entered by the user into the ticket entry web page 1300, the customer's location (e.g., by zip code 1302), attachments describing the parts or equipment the customer 102 is seeking (e.g., a drawing or manual), etc.

Figure 15:
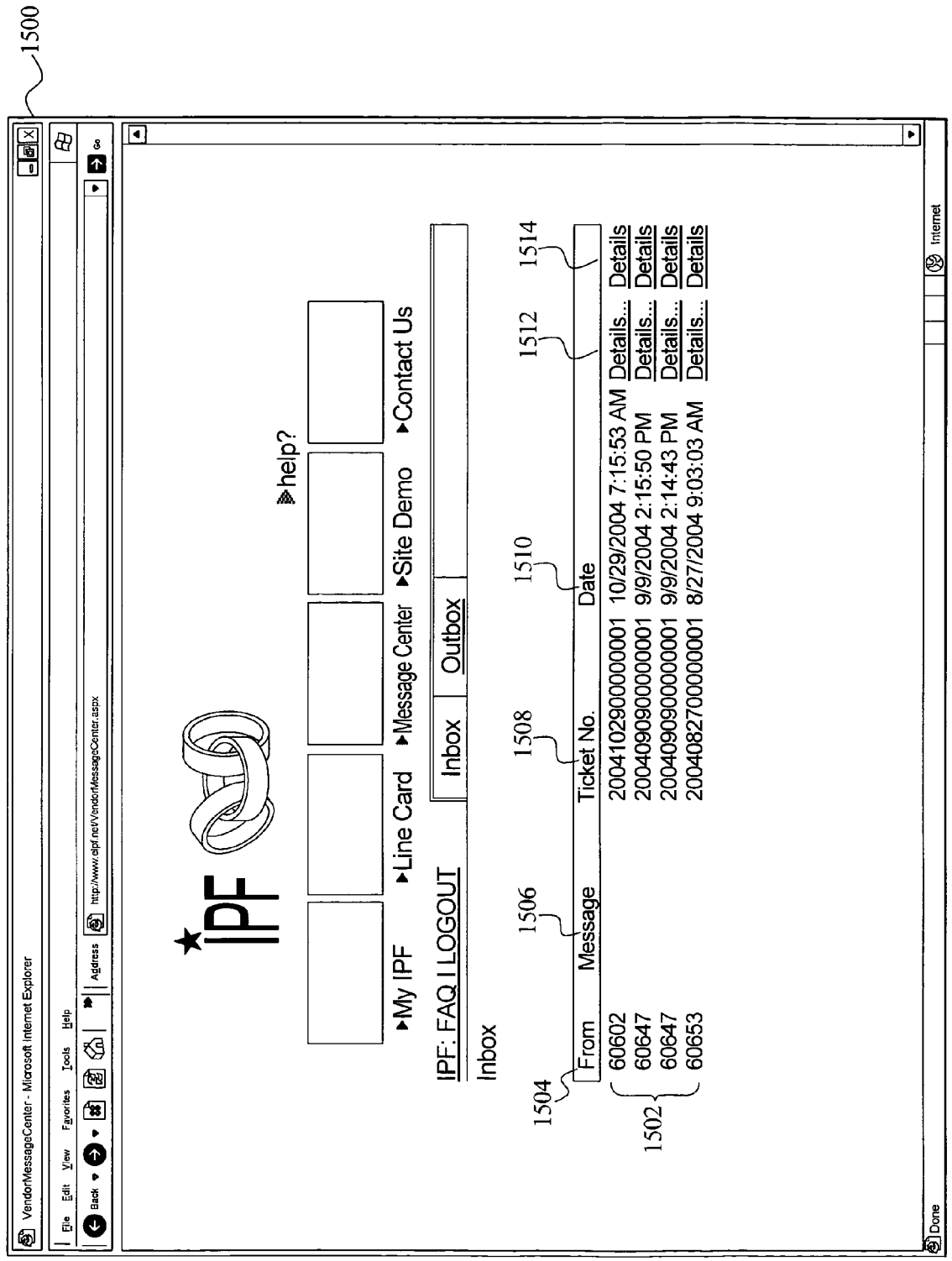
FIG. 15 is an example of a vendor inbox web page.

In response to vendors 106 clicking on the hyperlink embedded in the e-mail message and/or other hyperlink paths available to a logged in vendor 106, each vendor 106 may view his/her inbox web page 1500 (block 504). An example of a vendor inbox web page 1500 is illustrated in FIG. 15. In this example, the vendor 106 is shown four tickets 1502. The tickets 1502 do not include information identifying the customer 102 that generated the ticket. Instead, the "from" field 1504 of each ticket 1502 includes the zip code 1302 associated with the customer 102 that generated the ticket. Of course, a person of ordinary skill in the art will readily appreciate that any geographic identifier may be used. For example, an area code, city, and/or state associated with the customer 102 may be used to identify the customer's geographic location.

Each ticket 1502 may also include a message 1506 from the customer 102. For example, the customer 102 may indicate that he/she requires next day delivery. In addition, each ticket 1502 is identified by the unique ticket number 1508. Although the tickets 1502 do not include information identifying the customer 102 that generated the ticket 1502, the unique ticket number 1508 is associated with the customer 102 that generated the ticket 902 in the database 110 stored by the broker server 104. In this manner, the broker server 104 may facilitate the exchange of information between the customer 102 and one or more vendors 106 without revealing the identity of the customer 102 thereby eliminating potentially annoying sales calls from the vendors 106 to the customers 102.

Preferably, each ticket 1502 also includes a date 1510, a details hyperlink 1512, and a delete hyperlink 1514. The date 1510 is the date the ticket was generated or last updated. The details hyperlink 1512 takes the vendor 106 to another web page showing all of the information associated with the ticket 1502 (e.g., part numbers, quantities, etc.; See FIGS. 12-13), and the delete hyperlink 1514 removes the ticket 1502 from the vendor's inbox.

Figure 16:
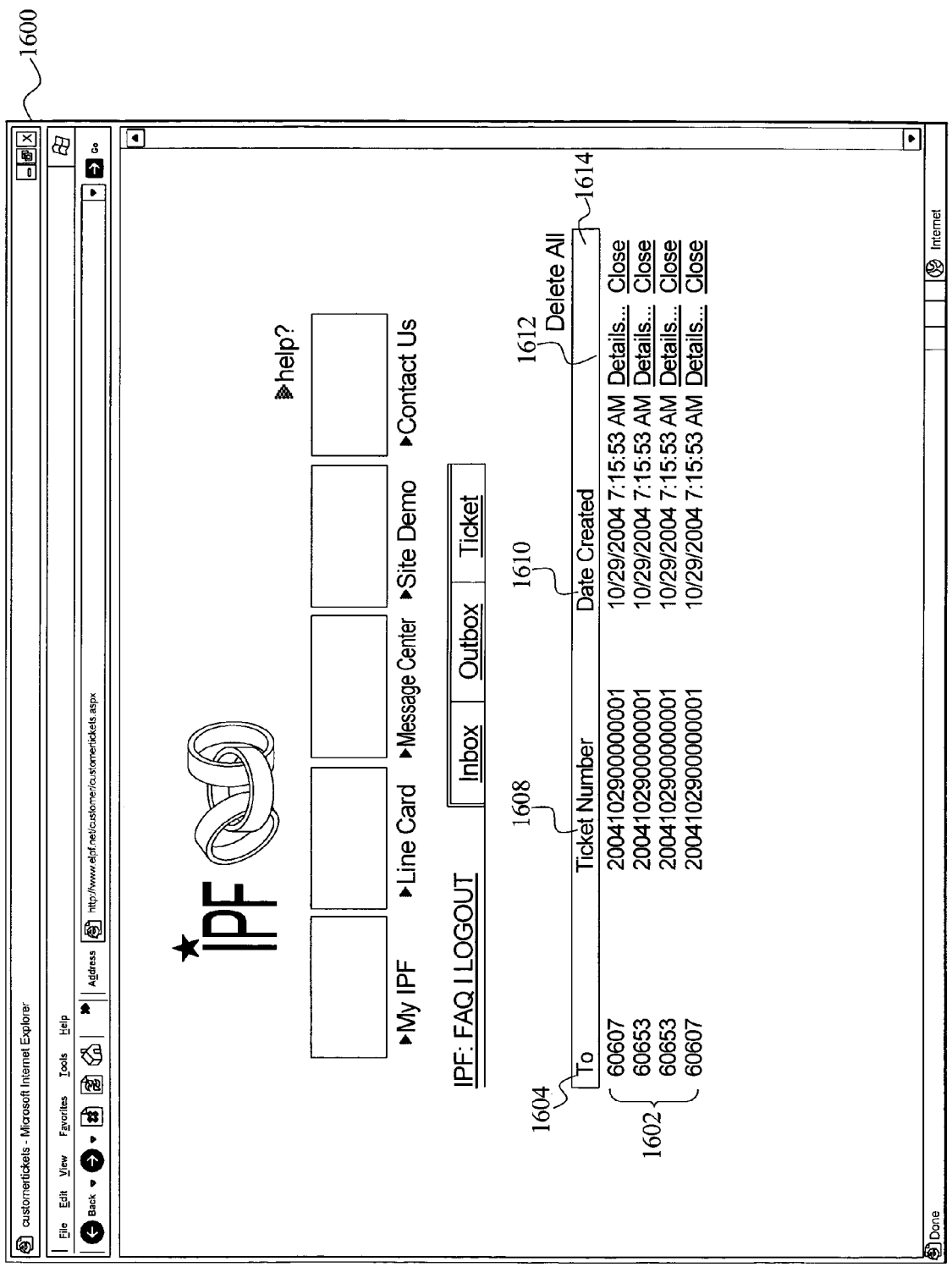
FIG. 16 is an example of a customer inbox web page.

Similarly, each customer 102 may view his/her inbox web page 1600. An example of a customer inbox web page 1600 is illustrated in FIG. 16. In this example, the customer 102 is shown four tickets 1602. The "to" field 1604 of each ticket 1602 includes the zip code 1126 associated with the vendor 106 that received the ticket. Again, any geographic identifier may be used. Like the vendor inbox, each ticket 1602 in the customer inbox is identified by the unique ticket number 1608. Preferably, each ticket 1602 also includes a date 1610, a details hyperlink 1612, and a close hyperlink 1614. The date 1610 is the date the ticket was created. The details hyperlink 1612 takes the customer 102 to another web page showing all of the information associated with the ticket 1502 (e.g., the ticket entry web page 1300, which includes a hyperlink to the vendor's web page), and the close hyperlink 1614 removes the ticket 1602 from the customer's inbox.

Returning to FIG. 5, the process 400 then receives an messages from the vendors 106 (block 506). Preferably, the messages from the vendors 106 include the unique message identifier and vendor supplied information about the customer's request. For example, the messages from the vendors 106 preferably include the ticket number 1402, the vendor's price for the goods requested, the quantity the vendor currently has in stock, and an estimated or promised delivery time. In addition, the messages from the vendors 106 may include a hyperlink to the vendor's web page, attachments, manuals, drawings, etc. For example, a responding vendor may include a hyperlink directly to the requested part(s) on the vendor's web site and an attached diagram confirming the correct part has been identified.

The process 400 then sends a notification e-mail message to the customer 102 (block 508), The notification e-mail preferably includes a hyperlink to a list of vendor responses. For example, the notification e-mail may include a hyperlink to the customer's inbox web page 1600 on the server 104.

If the customer 102 rejects a vendor (e.g., not the right part, price to high, etc.), the broker server 104 automatically selects another vendor 106. For example, if the customer 102 request five responses, and the customer 102 rejected the third response, then the sixth vendor (originally excluded) would replace the third vendor in the top five list.

If the customer is viewing a vendor response (i.e., a bid) that he/she would like to purchase, the customer 102 may fill in the purchase order number 1338 (see FIG. 13) and press the send button 1336. At any point during the process 400, the customer 102 may contact a vendor 106 via any conventional means (e.g., the telephone). The purchase order for the selected vendor 106 is then sent from the customer 102 to the server 104 (block 510). In response, the server 104 sends a purchase message to the vendor 1076 (block 512).

In summary, persons of ordinary skill in the art will readily appreciate that methods and apparatus to anonymously request bids from a geographically centered plurality of vendors have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of requesting bids from a plurality of vendors, the method comprising:

controlling a plurality of graphical interfaces which are operatively coupled to a database and a processor, the processor being operable over a network, the graphical interfaces including: (a) a vendor registration graphical interface; (b) a request graphical interface; (c) a first additional graphical interface; and (d) a second additional graphical interface;

receiving, through the vendor registration graphical interface, product/service information and geographical information from each one of the plurality of vendors;

receiving, through the request graphical interface, a request for a product/service from a customer, the request including request data indicative of: (a) the product/service; (b) a desired delivery location; and (c) a quantity of a plurality of desired responses;

storing a unique request identifier associated with the request;

determining that a first geographical area is closer to the desired delivery location than a second geographical area is to the desired delivery location;

selecting a first quantity of vendors associated with the first geographical area;

selecting a second quantity of vendors associated with the second geographical area if the first quantity of vendors is less than the quantity of desired responses;

sending at least one electronic message to each one of the selected vendors, the at least one electronic message including a first activator which is operatively coupled to the first additional graphical interface, the first additional graphical interface: (i) indicating the unique request identifier; (ii) including a second activator which is operatively coupled to a third additional graphical interface, the third additional graphical interface being accessible over the network, the third additional graphical interface indicating at least part of the request data; and (iii) includes a third activator which, when activated, rejects the request; and enabling the customer to access the second additional graphical interface, the second additional graphical interface: (a) indicating the unique request identifier; (b) including a second activator which is operatively coupled to a fourth additional graphical interface, the fourth additional graphical interface being accessible over the network, the fourth additional graphical interface indicating at least part of the product/service information; and (c) including a third activator which, when activated, closes the request.

2. The method of claim 1, wherein selecting the first quantity of vendors associated with the first geographical area is based on the data indicative of the product/service, the data indicative of the desired delivery location, the product/service information, and the geographical information.

3. The method of claim 1, wherein selecting the second quantity of vendors associated with the second geographical area is based on the data indicative of the product/service, the data indicative of the desired delivery location, the product/service information, and the geographical information.

4. The method of claim 1, wherein the at least one electronic message to the first quantity of vendors is anonymous with respect to the customer.

5. The method of claim 1, wherein the first activator is a hyperlink.

6. The method of claim 1, further comprising cross referencing the data indicative of the product/service to data indicative of a related product/service, wherein the at least one electronic message includes at least a portion of the data indicative of the related product/service.

7. The method of claim 1, further comprising receiving a message indicative of a rejected vendor from the customer and automatically selecting a replacement vendor for the rejected vendor.

8. The method of claim 1, wherein the at least one electronic message includes an attachment from the customer, the attachment facilitating identification of the product/service.

9. The method of claim 1, further comprising receiving a second electronic message from at least one of the first quantity of vendors, the second electronic message including data supplied by the at least one of the first quantity of vendors.

10. The method of claim 9, which includes accessing the unique message identifier by accessing the second electronic message.

11. The method of claim 9, wherein the second electronic message includes at least a portion of the data indicative of the product/service.

12. The method of claim 9, which includes providing access to a hyperlink at the second electronic message, wherein activation of the hyperlink provides access to a fifth additional graphical interface associated with the at least one of the first quantity of vendors.

13. The method of claim 9, wherein the second electronic message includes at least one of pricing information, quantity information, availability information, and delivery time information.

14. The method of claim 9, which includes providing access to an attachment by providing access to the second electronic message, wherein the second electronic message includes an attachment from the at least one of the first quantity of vendors, the attachment containing information associated with the product/service.

15. The method of claim 14, which includes providing access to an electronic document by providing access to the attachment, the electronic document being selected from the group consisting of a manual associated with the product/service and a drawing associated with the product/service.

16. The method of claim 9, further comprising sending a third electronic message to one of the first quantity of vendors, the third electronic message including purchase information.

17. The method of claim 1, wherein the product/service information includes at least one of a list of products/services, a list of manufacturer names, general product/service descriptions, and detailed product/service descriptions.

18. The method of claim 1, wherein the geographical information includes at lease one of a zip code and an area code.

19. The method of claim 1, wherein the data indicative of the product/service includes at least one of a part number, a manufacturer, and a part description.

20. The method of claim 1, wherein the data indicative of the product/service includes at least one of a category and a keyword.

21. The method of claim 1, wherein the data indicative of the desired delivery location includes a zip code.

22. The method of claim 1, wherein the data indicative of the desired delivery location includes an area code.

23. The method of claim 1, wherein determining that the first geographical area is closer to the desired delivery location than the second geographical area is to the desired delivery location includes retrieving data from a lookup table.

24. The method of claim 23, wherein the lookup table includes at least one of zip codes and area codes.

25. The method of claim 1, further comprising receiving the product/service information for each of the plurality of vendors from the plurality of vendors via the vendor registration graphical interface.

26. The method of claim 1, including storing a unique anonymous identifier associated with a unique identifier of the customer.

27. The method of claim 1, wherein the at least one electronic message includes the unique request identifier and excludes the unique customer identifier.

28. A server comprising:
a network connection;
a memory device storing (i) product/service information for each of a plurality of vendors, (ii) geographical information for each of the plurality of vendors, (iii) a software program; and (iv) data corresponding to a plurality of graphical interfaces, the graphical interfaces including a vendor registration graphical interface, a request graphical interface, a first additional graphical interface, and a second additional graphical interface; and
a processor operably connected to the network connection and the memory device, wherein the software program is structured to be executed by the processor to cause the server to:
receive, through the vendor registration graphical interface, product/service information and geographical information for from each one of the plurality of vendors;
receive a request for a product/service from a customer through the request registration graphical interface, the request including request data indicative of: (a) the product/service; (b) a desired delivery location; and (c) a quantity of desired responses;
store a unique request identifier associated with the request;
determine that a first geographical area is closer to the desired delivery location than a location of one or more other geographical areas relative to the desired delivery location;
select a first quantity of vendors associated with the first geographical area;
successively select a second quantity of vendors associated with each of the other geographical areas until a total of the selected vendors is at least equal to the quantity of desired responses;
store a unique anonymous identifier associated with a unique customer identifier of the customer;
send at least one electronic message to each of the selected vendors, the at least one electronic message including a first activator which is operatively coupled to the first additional graphical interface, the first additional graphical interface: (i) indicating the unique request identifier; (ii) including a second activator which is operatively coupled to a third additional graphical interface, the third additional graphical interface being accessible over the network, the third additional graphical interface indicating at least part of the request data; and (iii) including a third activator which, when activated, rejects the request; and
enable the customer to access the second additional graphical interface, the second additional graphical interface: (a) indicating the unique request identifier; (b) including a second activator which is operatively coupled to a fourth additional graphical interface, the fourth additional graphical interface being accessible over the network, the fourth additional graphical interface indicating at least part of the product/service information; and (c) including a third activator which, when activated, closes the request.

29. The server of claim 28, wherein the server selects the first quantity of vendors associated with the first geographical area based on the data indicative of the product/service, the data indicative of the desired delivery location, the product/service information, and the geographical information.

30. The server of claim 28, wherein the at least one electronic message to the first quantity of vendors is anonymous with respect to the customer.

31. The server of claim 28, wherein the first activator is a hyperlink.

32. The server of claim 28, wherein the at least one electronic message includes at least a portion of the data indicative of the product/service and at least a portion of the data indicative of the desired delivery location.

33. The server of claim 28, wherein the at least one electronic message includes an attachment from the customer, the attachment facilitating identification of the product/service.

34. The server of claim 28, further comprising receiving a second electronic message from at least one of the first quantity of vendors, the second electronic message including data supplied by the at least one of the first quantity of vendors and the unique message identifier.

35. The server of claim 34, wherein the second electronic message includes at least a portion of the data indicative of the product/service and a hyperlink to a fifth additional graphical interface associated with the at least one of the first quantity of vendors.

36. The server of claim 34, wherein the second electronic message includes at least one of pricing information, quantity information, availability information, and delivery time information.

37. The server of claim 34, wherein the second electronic message includes an attachment from the at least one of the first quantity of vendors, the attachment containing at least one of a manual associated with the product/service and a drawing associated with the product/service.

38. The server of claim 34, further comprising sending a third electronic message to one of the first quantity of vendors, the third electronic message including purchase information.

39. The server of claim 28, wherein the product/service information includes at least one of a list of products/services, a list of manufacturer names, general product/service descriptions, and detailed product/service descriptions.

40. The server of claim 28, wherein the geographical information includes at lease one of a zip code and an area code.

41. The server of claim 28, wherein the data indicative of the product/service includes at least one of a part number, a manufacturer, a part description, a category and a keyword.

42. The server of claim 28, wherein the data indicative of the desired delivery location includes at least one of a zip code and an area code.

43. The server of claim 28, further comprising receiving the product/service information for each of the plurality of vendors via the vendor registration graphical interface.

44. The server of claim 28, further comprising storing a unique anonymous identifier associated with a unique identifier of the customer.

45. The server of claim 28, wherein the at least one electronic message includes the unique request identifier and excludes the unique customer identifier.

46. A computer readable medium comprising a plurality of computer readable instructions operable to cause a computing device to:
 access data corresponding to a plurality of graphical interfaces including: (a) a vendor registration graphical interface; (b) a request graphical interface; (c) a first additional graphical interface; and (d) a second additional graphical interface;
 receive, through the vendor registration graphical interface, product/service information and geographical information for each one of a plurality of vendors;
 store the product/service information and geographical information provided by each one of the vendors;
 receive through the request graphical interface, a request for a service from a customer, the request including request data indicative of:(a) the service; (b) a desired delivery location; and (c) a quantity of desired responses;
 store a unique request identifier associated with the request;
 determine that a first geographical area is closer to the desired delivery location than a second geographical area is to the desired delivery location;
 select a first quantity of vendors associated with the first geographical area;
 select a second quantity of vendors associated with the second geographical area if the first quantity of vendors is less than the quantity of desired responses;
 store a unique anonymous identifier associated with a unique customer identifier of the customer;
 send at least one electronic message to each one of the selected vendors, the at least one electronic message: including a first activator which is operatively coupled to the first additional graphical interface, the first additional graphical interface: (i) indicating the unique request identifier; (ii) including a second activator which is operatively coupled to a third additional graphical interface, the third additional graphical interface being accessible over the network, the third additional graphical interface indicating at least part of the request data; and (iii) including a third activator which, when activated, rejects the request; and
 enable the customer to access the second additional graphical interface, the second additional graphical interface: (a) indicating the unique request identifier; (b) including a second activator which is operatively coupled to a fourth additional graphical interface, the fourth additional graphical interface being accessible over the network, the fourth additional graphical interface indicating at least part of the product/service information; and (c) including a third activator which, when activated, closes the request.

47. The computer readable medium of claim 46, wherein the instructions are structured to cause the computing device to select the first quantity of vendors associated with the first geographical area based on the data indicative of the service, the data indicative of the desired delivery location, the product/service information, and the geographical information.

48. The computer readable medium of claim 46, wherein the at least one electronic message to the first quantity of vendors is anonymous with respect to the customer.

49. The computer readable medium of claim 46, wherein the first activator is a hyperlink.

50. The computer readable medium of claim 46, wherein the at least one electronic message includes at least a portion of the data indicative of the service, at least a portion of the data indicative of the desired delivery location, and an attachment from the customer facilitating identification of the service.

51. The computer readable medium of claim 46, wherein the instructions are structured to cause the computing device to receive a second electronic message from at least one of the first quantity of vendors, the second electronic message including data supplied by the at least one of the first quantity of vendors, the unique message identifier, at least a portion of the data indicative of the service, and a hyperlink to a fifth graphical interface associated with the at least one of the first quantity of vendors.

52. The computer readable medium of claim 51, wherein the second electronic message includes at least one of pricing information, quantity information, availability information, and delivery time information.

53. The computer readable medium of claim 51, wherein the second electronic message includes an attachment from the at least one of the first quantity of vendors, the attachment containing at least one of a manual associated with the service and a drawing associated with the service.

54. The computer readable medium of claim 51, wherein the instructions are structured to cause the computing device to send a third electronic message to one of the first quantity of vendors, the third electronic message including purchase information.

55. The computer readable medium of claim 46, wherein the product/service information includes at least one of a list of products/services, a list of manufacturer names, general product/service descriptions, and detailed product/service descriptions.

56. The computer readable medium of claim 46, wherein the geographical information includes at lease one of a zip code and an area code.

57. The computer readable medium of claim 46, wherein the data indicative of the service includes at least one of a part number, a manufacturer, a part description, a category and a keyword.

58. The computer readable medium of claim 46, wherein the instructions are structured to cause the computing device to select the first quantity of vendors associated with the first geographical area based on a customer requirement falling within a range of values associated with at least one of the first quantity of vendors.

59. The computer readable medium of claim 46, wherein the instructions are structured to cause the computing device to store a unique anonymous identifier associated with a unique identifier of the customer.

60. The computer readable medium of claim 46, wherein the at least one electronic message includes the unique request identifier and excludes the unique customer identifier.

* * * * *